(12) United States Patent
Tagawa et al.

(10) Patent No.: US 12,555,133 B2
(45) Date of Patent: Feb. 17, 2026

(54) INFORMATION PROCESSING DEVICE, FACE AUTHENTICATION PROMOTION SYSTEM, INFORMATION PROCESSING METHOD, NON-TRANSITORY COMPUTER READABLE MEDIUM STORING PROGRAM

(71) Applicant: NEC Corporation, Tokyo (JP)

(72) Inventors: Risa Tagawa, Tokyo (JP); Noriyuki Hiramoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/906,257

(22) Filed: Oct. 4, 2024

(65) Prior Publication Data
US 2025/0029141 A1    Jan. 23, 2025

Related U.S. Application Data

(63) Continuation of application No. 18/011,788, filed as application No. PCT/JP2020/025492 on Jun. 29, 2020, now abandoned.

(51) Int. Cl.
G06K 9/00       (2022.01)
G06Q 30/0207    (2023.01)
G06V 40/16      (2022.01)

(52) U.S. Cl.
CPC ..... *G06Q 30/0236* (2013.01); *G06Q 30/0224* (2013.01); *G06V 40/172* (2022.01)

(58) Field of Classification Search
CPC .......... G06Q 30/0236; G06Q 30/0224; G06Q 50/10; G06V 40/172; G06V 40/16;
(Continued)

(56) References Cited

U.S. PATENT DOCUMENTS

2007/0242860 A1   10/2007  Hasebe et al.
2010/0063724 A1    3/2010  Arnaud et al.
(Continued)

FOREIGN PATENT DOCUMENTS

CN    109241931 A    1/2019  ......... G06K 9/00268
JP    2011-107932 A  6/2011
(Continued)

OTHER PUBLICATIONS

Vehicle Route Tracking System based on Vehicle Registration Number Recognition using Template Matching Algorithm p. 249, Lai Chor Kiew1, Abu Jafar Md Muzahid2, and Syafiq Fauzi Kamarulzaman (Year: 2020).*

(Continued)

*Primary Examiner* — Ilana L Spar
*Assistant Examiner* — Darnell A Pouncil
(74) *Attorney, Agent, or Firm* — Sughrue Mion, PLLC

(57) ABSTRACT

An information processing device includes an acquisition unit, an authentication request unit, a generation unit, and a determination unit. The authentication request unit causes biometric authentication to be performed on biometric information about a user acquired by one or more installed terminals arranged in various places to be compared with biometric information about registered users. The acquisition unit acquires time information about a time when the biometric authentication has been successful. The generation unit generates route information about the user based on position information about the one or more installed terminals for which the biometric authentication has been successful and the time information about the time when the biometric authentication has been successful. The determination unit determines a privilege for the user based on the route information.

9 Claims, 18 Drawing Sheets

(58) Field of Classification Search
CPC ..... G06V 40/70; A63F 13/213; A63F 13/216; A63F 13/35; A63F 13/5378; A63F 13/69
See application file for complete search history.

(56) References Cited

U.S. PATENT DOCUMENTS

| | | | |
|---|---|---|---|
| 2013/0044922 A1* | 2/2013 | Hio | G06Q 30/0261 382/118 |
| 2014/0230033 A1 | 8/2014 | Duncan | G06F 21/32 726/7 |
| 2015/0358775 A1 | 12/2015 | Cronin | |
| 2019/0007799 A1 | 1/2019 | Jones et al. | |
| 2022/0237279 A1 | 7/2022 | Cornick et al. | |

FOREIGN PATENT DOCUMENTS

| | | | |
|---|---|---|---|
| JP | 2013-041416 A | 2/2013 |
| JP | 2013-162258 A | 8/2013 |
| JP | 2018-108172 A | 7/2018 |

OTHER PUBLICATIONS

International Search Report for PCT Application No. PCT/JP2020/025492, mailed on Sep. 15, 2020.
U.S. Office Action for U.S. Appl. No. 18/906,253, mailed on Oct. 1, 2025.

* cited by examiner

INFORMATION PROCESSING DEVICE, FACE AUTHENTICATION PROMOTION SYSTEM, INFORMATION PROCESSING METHOD, NON-TRANSITORY COMPUTER READABLE MEDIUM STORING PROGRAM

This application is a Continuation of U.S. application Ser. No. 18/011,788 filed on Dec. 20, 2022, which is a National Stage Entry of PCT/JP2020/025492 filed on Jun. 29, 2020, the contents of all of which are incorporated herein by reference, in their entirety.

TECHNICAL FIELD

The present disclosure relates to an information processing device, a face authentication promotion system, an information processing method, and a non-transitory computer readable media storing a program.

BACKGROUND ART

Patent Literature 1 discloses a game system that can achieve, for example, event control reflecting reliability of position information in a system in which an action of visiting various places to earn points is integrated with occurrences of game events.

CITATION LIST

Patent Literature

Patent Literature 1: Japanese Unexamined Patent Application Publication No. 2018-108172

SUMMARY OF INVENTION

Technical Problem

By the way, systems using biometric authentication such as face authentication have been developed for use in various places such as airports. Widespread use of such biometric authentication by various users is desired.

The present disclosure has been made to solve such a problem and an object thereof is to provide an information processing device, a face authentication promotion system, an information processing method, and a program that can promote the use of biometric authentication.

Solution to Problem

In a first example aspect of the present disclosure, an information processing device includes:
  an authentication request unit configured to cause biometric authentication to be performed on biometric information about a user acquired by one or more installed terminals arranged in various places to be compared with biometric information about registered users;
  an acquisition unit configured to acquire time information about a time when the biometric authentication has been successful;
  a generation unit configured to generate route information about the user based on position information about the one or more installed terminals for which the biometric authentication has been successful and the time information about the time when the biometric authentication has been successful; and
  a determination unit configured to determine a privilege for the user based on the route information.

In a second example aspect of the present disclosure, a face authentication promotion system includes:
  a camera configured to capture a user;
  the above information processing device;
  a position information acquisition unit configured to acquire position information about a user terminal owned by the user; and
  an authentication device configured to execute processing for comparing a captured face image of the user with a pre-registered registered image.

In a third example aspect of the present disclosure, an information processing method includes:
  causing biometric authentication to be performed on biometric information about a user acquired by one or more installed terminals arranged in various places to be compared with biometric information about registered users;
  acquiring time information about a time when the biometric authentication has been successful;
  generating route information about the user based on position information about the one or more installed terminals for which the biometric authentication has been successful and the time information about the time when the biometric authentication has been successful; and
  determining a privilege for the user based on the route information.

In a fourth example aspect of the present disclosure, a non-transitory computer readable medium storing a program causes a computer to execute:
  processing of causing biometric authentication to be performed on biometric information about a user acquired by one or more installed terminals arranged in various places to be compared with biometric information about registered users;
  processing of acquiring time information about a time when the biometric authentication has been successful;
  processing of generating route information about the user based on position information about the one or more installed terminals for which the biometric authentication has been successful and the time information about the time when the biometric authentication has been successful; and
  processing of determining a privilege for the user based on the route information.

Advantageous Effects of Invention

According to the present disclosure, it is possible to provide an information processing device and the like that can promote the use of biometric authentication.

EXAMPLE EMBODIMENT

First Example Embodiment

Hereinafter, example embodiments of the present disclosure are described below with reference to the drawings.

Figure 1:
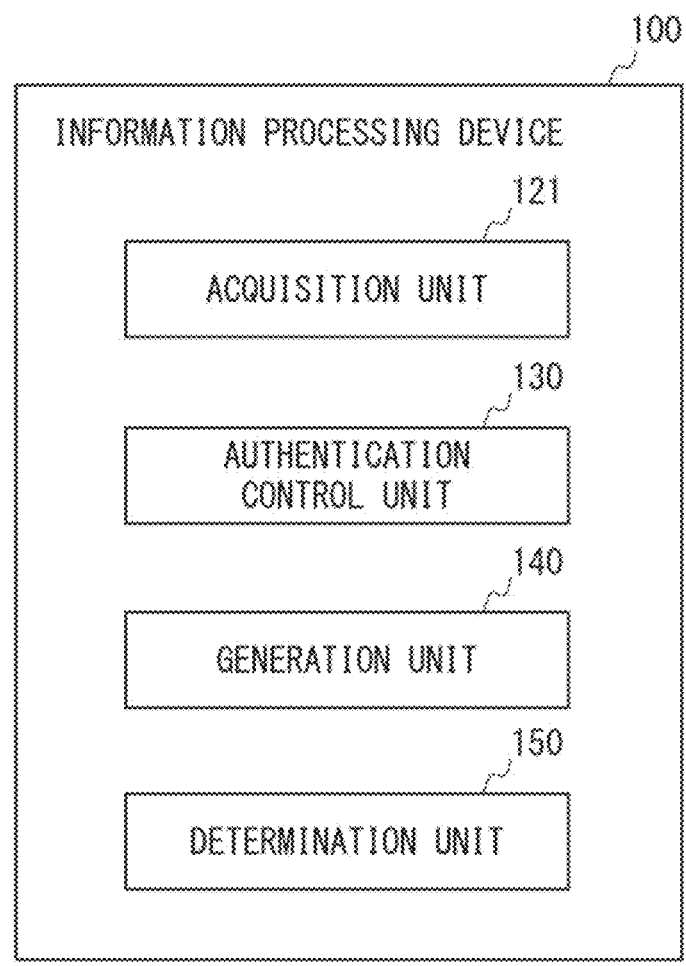
FIG. 1 is a block diagram showing a configuration of an information processing device according to a first example embodiment.

FIG. 1 is a block diagram showing a configuration of an information processing device according to a first example embodiment.

The information processing device 100 may be used to determine a privilege for a user by using position information about one or more installed terminals for which biometric authentication has been successful and time information about a time when the biometric authentication has been successful in order to promote the use of the installed terminals for performing biometric authentication. The biometric information includes biometric information such as face images, fingerprint images, iris images, voiceprints, veins, and palms. The installed terminal may include a camera, an infrared camera, or a dedicated scanner to acquire such biometric information. The information processing device 100 is an electronic circuit unit composed of a CPU, a memory, an interface circuit, and so on (not shown). This information processing device 100 performs predetermined control processing by a CPU executing a program to be implemented. The information processing device 100 includes an acquisition unit 121, an authentication request unit 130, a generation unit 140, and a determination unit 150.

The authentication request unit 130 requests biometric authentication to be performed on biometric information about a user acquired by one or more installed terminals arranged in various places to be compared with registered biometric information about registered users. The acquisition unit 121 acquires the time information about a time when biometric authentication is successful. The generation unit 140 generates route information about the user based on the position information about the one or more installed terminals for which biometric authentication has been successful and the time information about a time when the biometric authentication has been successful. The determination unit 150 determines the privilege for the user based on the route information. The privileges for the user may be in various forms, such as tangible objects including prizes or intangible objects including useful information.

Figure 2:
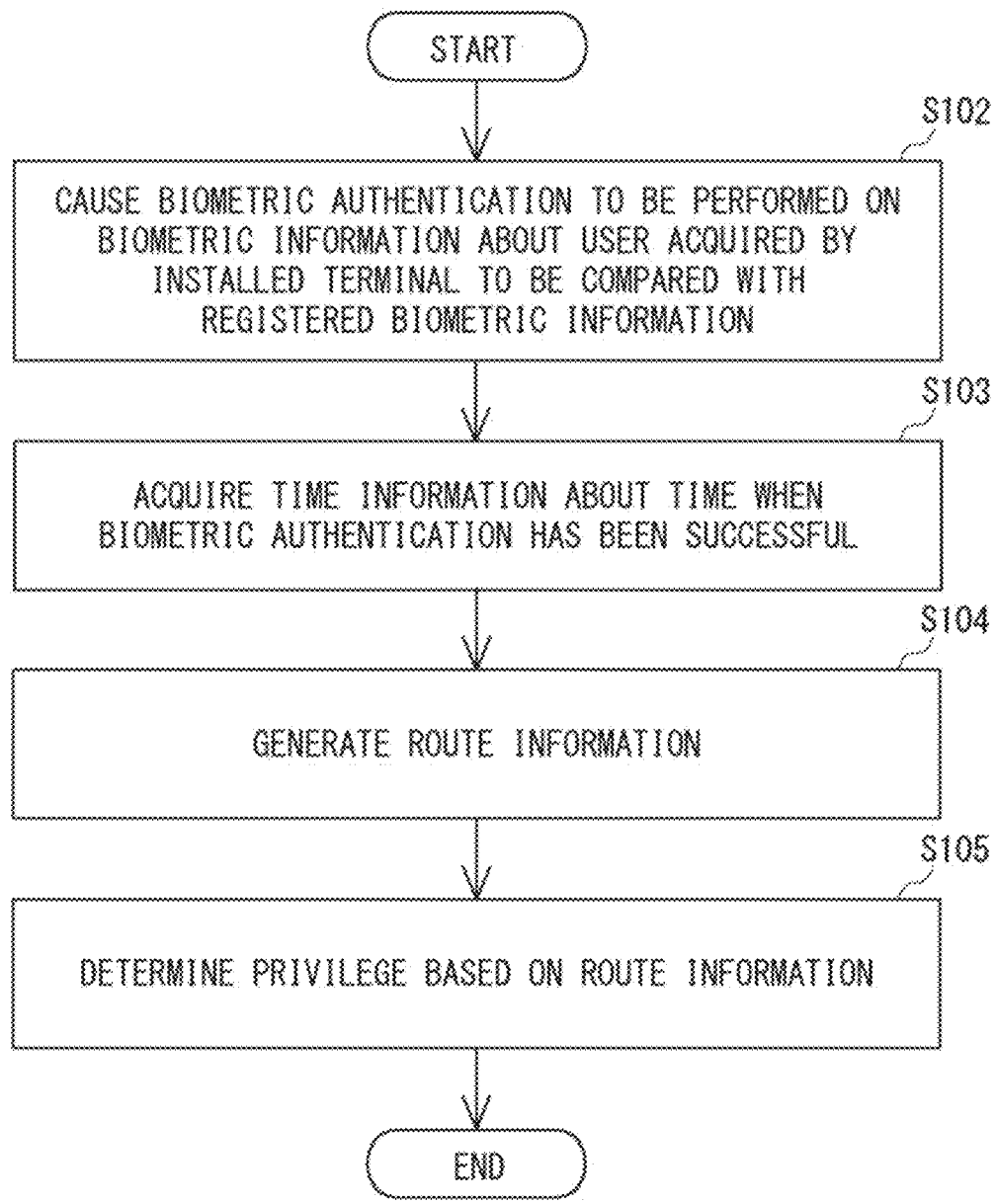
FIG. 2 is a flowchart showing a flow of an information processing method according to the first example embodiment.

FIG. 2 is a flowchart showing a flow of an information processing method according to the first example embodiment.

Biometric authentication is performed on the biometric information about the user acquired by one installed terminal from among the plurality of installed terminals arranged in various places to be compared with the registered biometric information about the registered users (Step S102). The time information about a time when biometric authentication is successful is acquired (Step S103). The route information for the user is generated based on the position information about one or more installed terminals for which biometric authentication has been successful and the time information about a time when the biometric authentication has been successful (Step S104). The privilege for the user is determined based on the route information (Step S105).

According to the first example embodiment described above, the use of biometric authentication can be promoted by motivating users to use biometric authentication.

Second Example Embodiment

Figure 3:
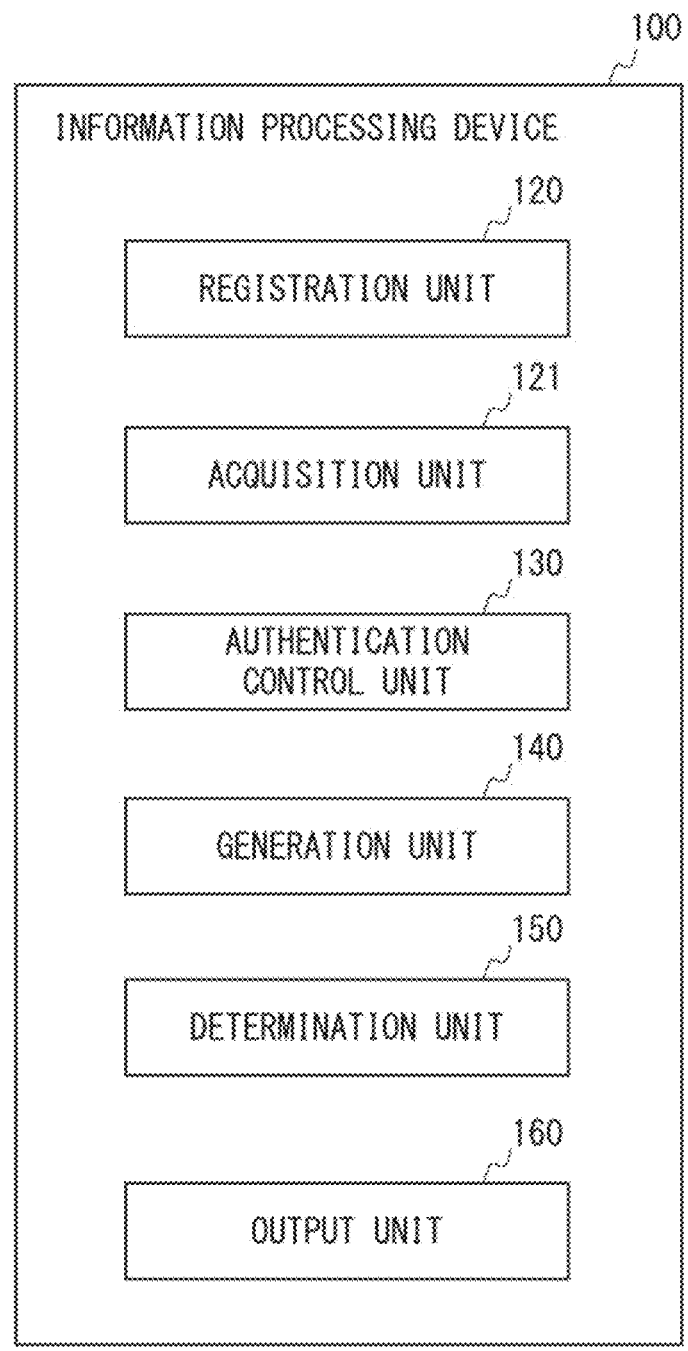
FIG. 3 is a block diagram showing a configuration of an information processing device according to a second example embodiment.

FIG. 3 is a block diagram showing a configuration of an information processing device according to a second example embodiment.

In FIG. 3, the same components as those in the first example embodiment are denoted by the same signs as those in FIG. 1, and descriptions thereof are omitted as appropriate. The biometric authentication according to the first example embodiment is face authentication in which a face image of a user captured by a camera of an installed terminal is compared with face images of registered users. In this example embodiment, a registration unit 120 and an output unit 160 are further included. The registration unit 120 registers the face image of the user and the user's identification information in association with each other. The output unit 160 outputs a privilege for the user to the installed terminal or the user terminal. The privilege for the user according to this example embodiment can be useful information for the user. In particular, in regard to the information useful for the user according to this example embodiment, the output unit 160 outputs a face image of the user captured by a camera of an installed terminal and then subjected to predetermined processing as the privilege. An example of the "face image of the user subjected to predetermined processing" may be obtained by combining a fictitious character that changes or grows according to the accumulated scores with the captured face image of the user. The registration unit 120 may be included in a user terminal, which will be described later, owned by a user, or installed terminal and is not an essential component.

Figure 4:
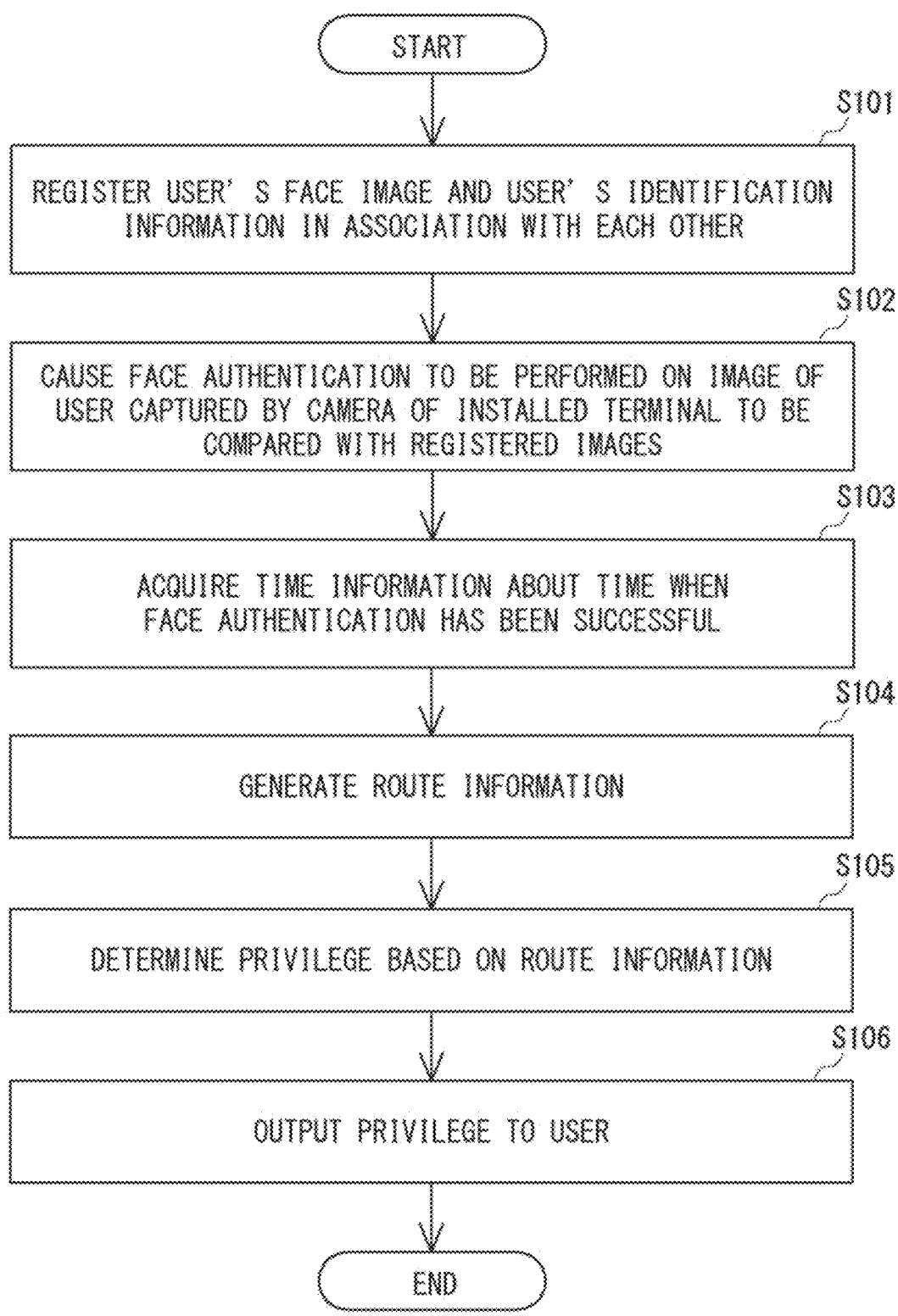
FIG. 4 is a flowchart showing a flow of an information processing method according to the second example embodiment.

FIG. 4 is a flowchart showing a flow of an information processing method according to the second example embodiment.

The user's face image and the user's identification information are registered in association with each other (Step S101). Such registration may be performed by a user terminal, which will be described later, the installed terminal, or any server device (e.g., a face authentication promotion device described later). Face authentication is performed on the face image of the user captured by a camera of one or more installed terminals arranged in various places to be compared with the registered face images of the registered users (Step S102). The time information about a time when face authentication has been successful is acquired (Step S103). The route information for the user is generated based on the position information about one or more installed terminals for which face authentication has been successful and the time information about a time when the face authentication is successful (Step S104). The privilege for the user is determined based on the route information (Step S105). The privilege for the user is output to the installed terminal or the user terminal (Step S106).

According to the second example embodiment described above, the use of face authentication can be promoted by further motivating user to use face authentication and to continue using it. In addition, by using a captured image of a user used for face authentication as a privilege for the user, a comprehensive and integrated service can be achieved without any additional burden on the service provider.

Third Example Embodiment

Figure 5:
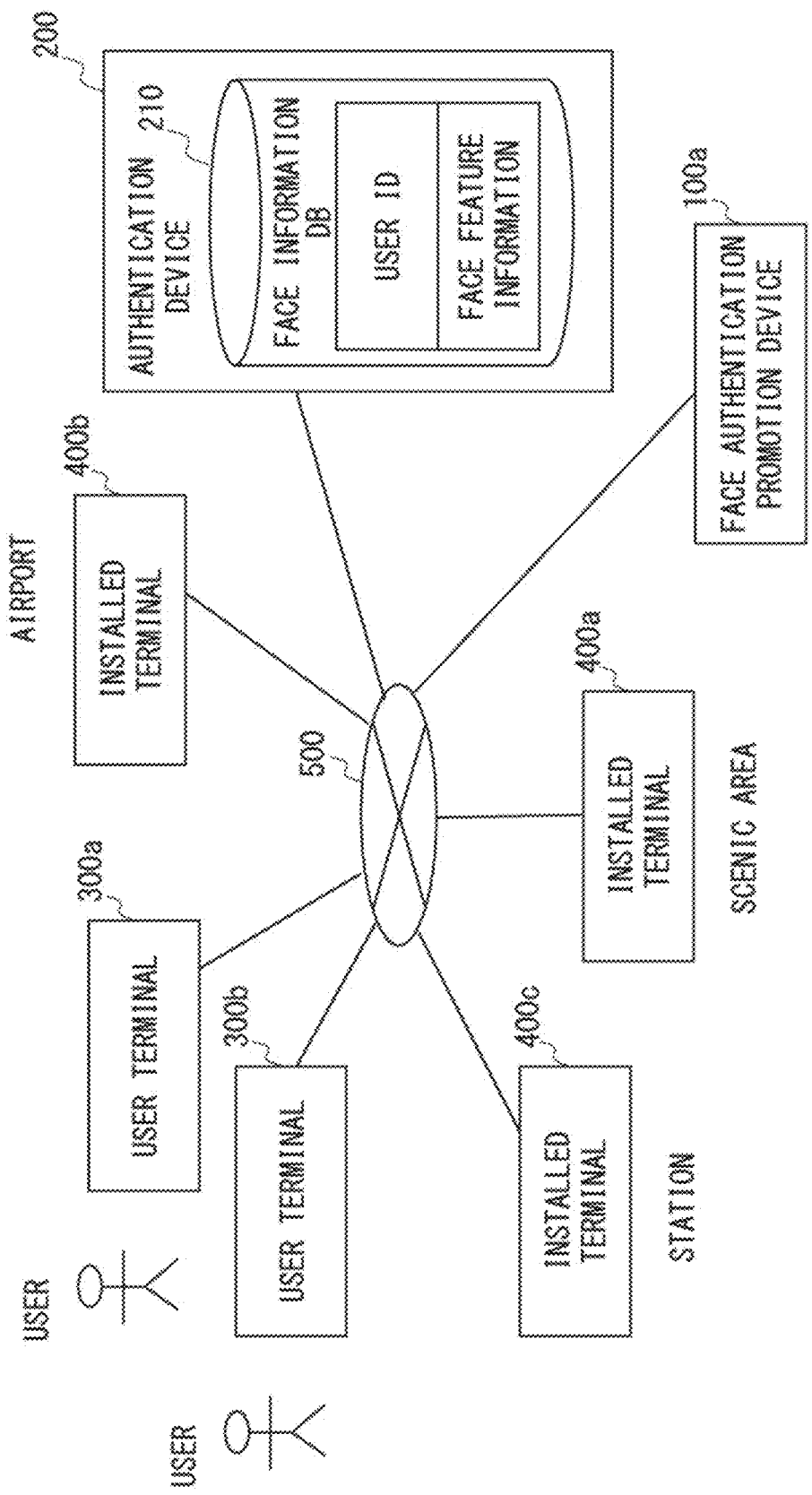
FIG. 5 is a block diagram showing a configuration of a face authentication promotion system according to a third example embodiment.

FIG. 5 is a block diagram showing a configuration of a face authentication promotion system according to a third example embodiment. The face authentication promotion system can be used to facilitate the use of face authentication by installed terminals installed in various places. In particular, the face authentication promotion system promotes, for the purpose of regional revitalization and tourism promotion, a plurality of installed terminals performing face authentication by using game-like elements and ideas (gamification). In the present specification, people who can use services using face authentication may be referred to as users.

Services using the face authentication include, but are not limited to, payment through face authentication, points awarded through face authentication, entry and exit through face authentication (e.g., stadiums, museums, leisure facilities, etc.), ticket gates through face authentication, boarding and exiting through face authentication (e.g., buses, taxis, ferries, etc.), and check-in and check-out through face authentication (e.g., an airport counter or hotel reception, or an alternative to a room key at a hotel).

As shown in FIG. 5, the face authentication promotion system includes a face authentication promotion device 100a, an authentication device 200, one or more user terminals 300 (300a and 300b), and one or more installed terminals 400 (400a to 400c). The face authentication promotion device 100a, the authentication device 200, the user terminal 300 and the installed terminal 400 are connected to each other via a wired or wireless network 500. The installed terminal 400 is a terminal that performs face authentication of the user by using an internal camera. The installed terminal is at a place in this system that directly engages with the user and is also called a touch point. The plurality of installed terminals 400 can be installed in various places. In FIG. 5, the installed terminal 400a is installed in a scenic area, the installed terminal 400b is installed in an airport, and the installed terminal 400c is installed in a station, but the present disclosure is not limited to this. For example, as noted above, places where services using face authentication can be used include stadiums, museums, leisure facilities, ticket gates, buses, taxis, ferries, airport counters, and hotel receptions. In addition, the plurality of installed terminals may be arranged in a predetermined area such as a shopping avenue. The face authentication promotion device 100a according to this example embodiment is a server device implemented by a computer and is an example of the information processing device 100 described above.

Figure 6:
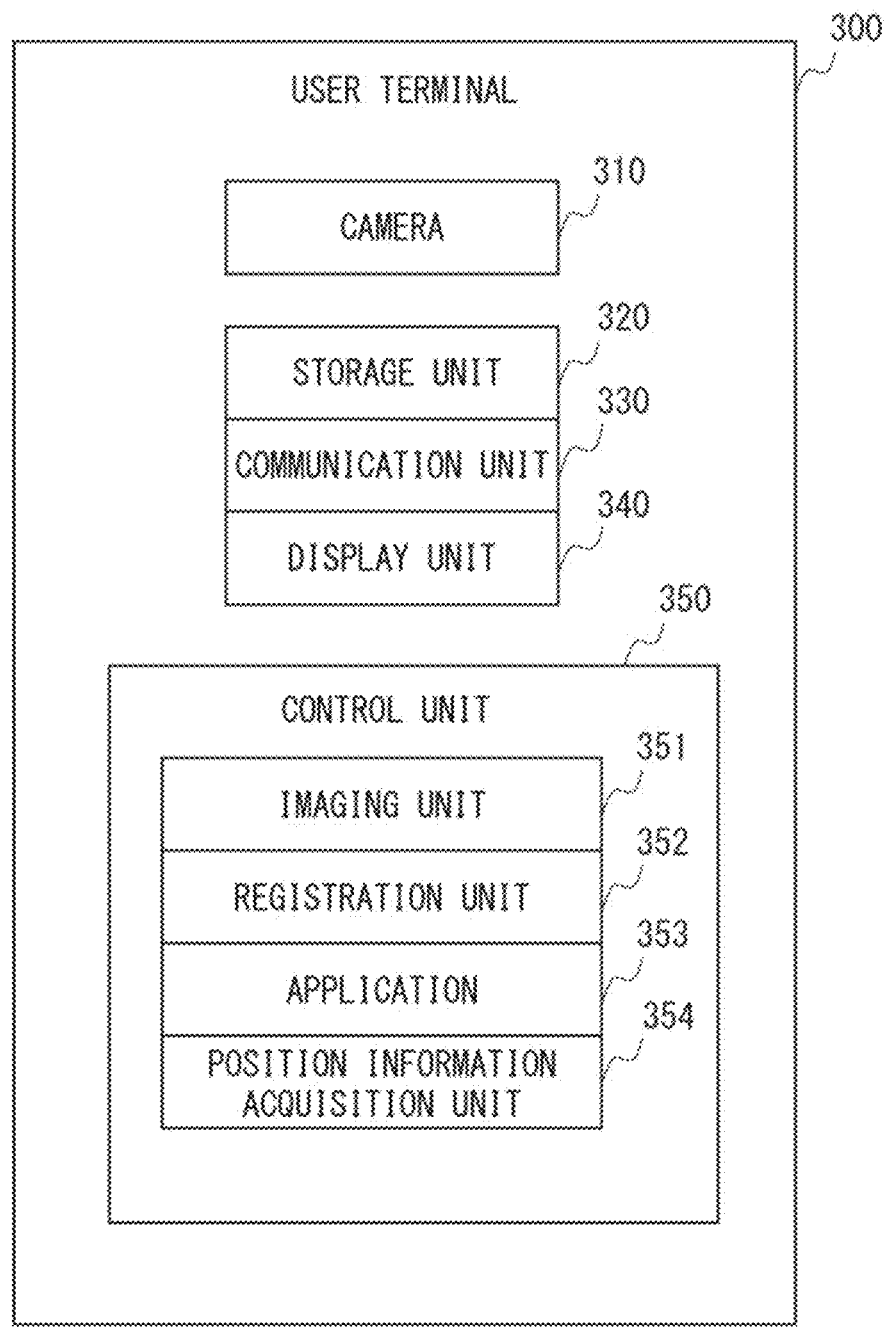
FIG. 6 is a block diagram showing a configuration of a user terminal according to the third example embodiment.

FIG. 6 is a block diagram showing a configuration of the user terminal 300.

The user terminal 300 is a terminal carried by the user and can be any information processing device such as a smartphone, a tablet, a PC (Personal Computer), or a wearable device. The user terminal 300 can receive face authentication promotion information and display it. The face authentication promotion information may include, for example, a face image of a user captured at the time of face authentication, map information about a nearby installed terminal, history information about face authentication for each user (including time information at the time of successful authentication), and privilege information to be imparted to each user. In addition, the user terminal 300 can acquire position information about the user terminal and transmit the position information to the face authentication promotion device 100a.

As shown in FIG. 6, the user terminal 300 includes a camera 310, a storage unit 320, a communication unit 330, a display unit 340, and a control unit 350. The control unit 350 further includes an imaging unit 351, a registration unit 352, an application 353, and a position information acquisition unit 354.

The camera 310 converts an object image formed by an optical lens in a lens barrel into image data by using the imaging unit, and displays the object image on the display unit 340 based on the converted image data. The camera 310 also records image data of still images and moving images in the recording unit 320. The camera 310 can be used to, in particular, capture the face image of the user or scan an identification card with the user's face image (e.g., driver's license, etc.). The storage unit 320 stores still image and moving image data and programs for implementing each function of the user terminal 300. The storage unit 320 is composed of, for example, a semiconductor memory, an optical disk, or a hard disc (HD).

The communication unit 330 is a communication interface with the network 500. The communication unit 330 is used to communicate with other network node devices that constitute the face authentication promotion system. The communication unit 330 may be used to perform wireless communication. For example, the communication unit 330 may be used to perform wireless LAN communication defined in the IEEE 802.11 series or mobile communication defined in 3GPP (3rd Generation Partnership Project) or the like.

The display unit 340 is composed of, for example, a touchscreen display. That is, the display unit 340 also functions as a reception unit that accepts an operation input by the user. The display unit 340 can also display the position information about the user terminal and the position information about nearby installed terminals on the map in the application 353. The display unit 340 can also display score information, privilege information, and time information about a time when authentication has been successful, which are imparted by the face authentication promotion system.

The control unit 350 is composed of a processor, a memory or the like, and reads software (computer program) into the memory or the like from the storage unit 320 to thereby perform various processing on the user terminal. The control unit 350 controls hardware of the user terminal 300. The processor may be, for example, a microprocessor, a Micro Processing Unit (MPU), or a Central Processing Unit (CPU). The processor may include more than one processor. The control unit 350 includes an imaging unit 351, a registration unit 352, an application 353, and a position information acquisition unit 354.

The imaging unit 351 controls the camera 310 to capture the user's image. This image includes at least the user's face. The registration unit 352 can transmit a face information registration request including the captured image of the user (registered image) to the authentication device 200 via the network 500. The user terminal 300 may display the output image on a screen of the display unit 340. The application 353 is an application program installed by the user. The application 353 can be logged in with login information (e.g., a combination of identification information and password that is unique to the user) that is unique to the user, receive the user-specific information from the face authentication promotion device 100a, and provide it to the user. The position information acquisition unit 354 can acquire the position information about the user terminal based on a signal received from a GPS receiver.

Figure 7:
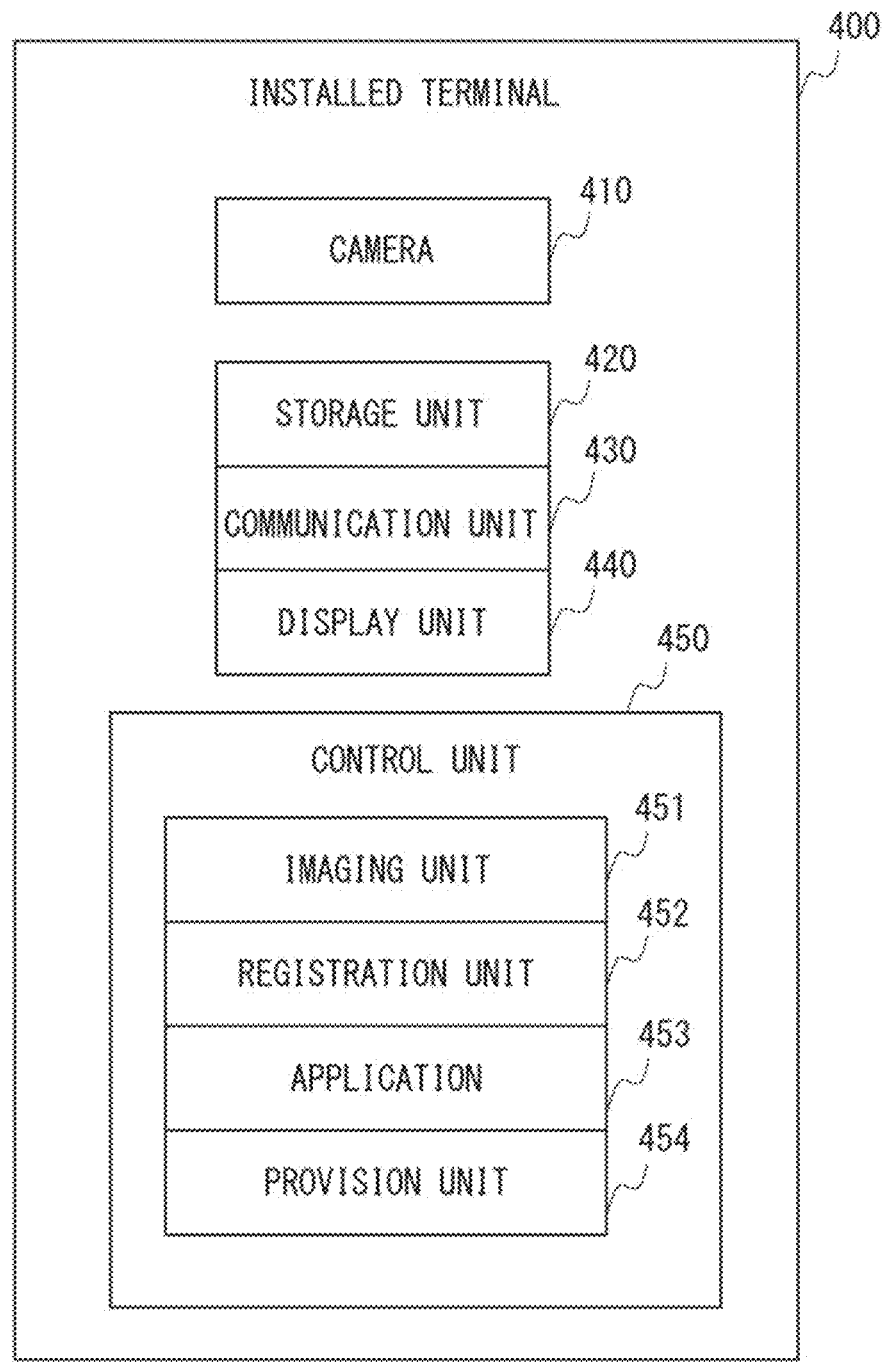
FIG. 7 is a block diagram showing a configuration of an installed terminal according to the third example embodiment.

FIG. 7 is a block diagram showing a configuration of the installed terminal. The installed terminal 400 performs face authentication of the user and, upon successful face authentication, may be used to execute various types of processing. The various types of processing include, but are not limited to, payment through face authentication, points awarded through face authentication, entry and exit through face authentication (e.g., stadiums, museums, leisure facilities, etc.), ticket gates through face authentication, boarding and exiting through face authentication (e.g., buses, taxis, ferries, etc.), and check-in and check-out through face authentication (e.g., airport counters or hotel receptions, or an alternative to a room key at a hotel).

The installed terminal 400 may be composed of a computer. As shown in FIG. 7, the installed terminal 400 includes a camera 410, a storage unit 420, a communication unit 430, a display unit 440, and a control unit 450. The control unit 450 includes an imaging unit 451, a registration unit 452, an application 453, and a provision unit 454. In this example, the installed terminal 400 includes the camera 410 and the display unit 440, but it is not necessary to include these components. In that case, the installed terminal 400 can be implemented by being connected to the external camera 410 and the external display unit 440 via a network. In addition to the camera 410, the installed terminal 400 may include an infrared camera for acquiring iris images and a dedicated scanner for scanning fingerprints, veins, and palms.

The camera 410 converts an object image formed by an optical lens in a lens barrel into image data by using the imaging unit, and displays the object image on the display unit 440 in a live view based on the converted image data. The camera 410 can recognize and capture the user's face in front of the installed terminal. The camera 410 also records image data of still images and moving images in the recording unit 420. The storage unit 420 is composed of, for example, a semiconductor memory, an optical disk, or a hard disc (HD).

The communication unit 430 is a communication interface with the network 500 similar to the communication unit 330 of the user terminal 300. The communication unit 430 can transmit the captured image data to the face authentication promotion device 100a via the network 500.

The display unit 440 is composed of, for example, a liquid crystal display, an organic EL (Electro luminescence) display, or the like. The display unit 440 can display the image data captured by the camera 410 in a live view. The display unit 440 can also display face authentication promotion information that promotes users to perform face authentication, for example, via the application 452.

The control unit 450 is composed of a processor, a memory or the like, and reads software (computer program) from the memory or the like to thereby perform various processing on the installed terminal. In addition, the control unit 450 controls hardware (e.g., camera, display unit, etc.) included in or connected to the outside of the installed terminal. The processor may be, for example, a microprocessor, a Micro Processing Unit (MPU), or a Central Processing Unit (CPU).

The control unit 450 includes an imaging unit 451, a registration unit 452, an application 453, and a provision unit 454. The imaging unit 451 controls the camera 410, recognizes the user's face or the like, and captures an image including the face image. The registration unit 452 can transmit a face information registration request including the captured image of the user (registered image) to the authentication device 200 via the network 500. If the user has not registered his/her own face image in the authentication device by using the registration unit of the user terminal, he/she may register his/her own face image in the authentication device by using the registration unit of the installed terminal when face authentication is first performed by the installed terminal. The application 453 is logged in with login information (e.g., a combination of ID and password) that is unique to the installed terminal (or the service provider) and can provide the face authentication promotion information from the face authentication promotion device 100a. The provision unit 454 provides various kinds of processing according to the result of the success or failure of face authentication from the authentication device or the face authentication promotion device. For example, if the installed terminal is a gate device, the provision unit 454 operates to open a gate when face authentication is successful. When the installed terminal is installed in a hotel, the provision unit 453 performs check-in processing by using personal information acquired from the authentication device when the face authentication is successful.

Figure 8:
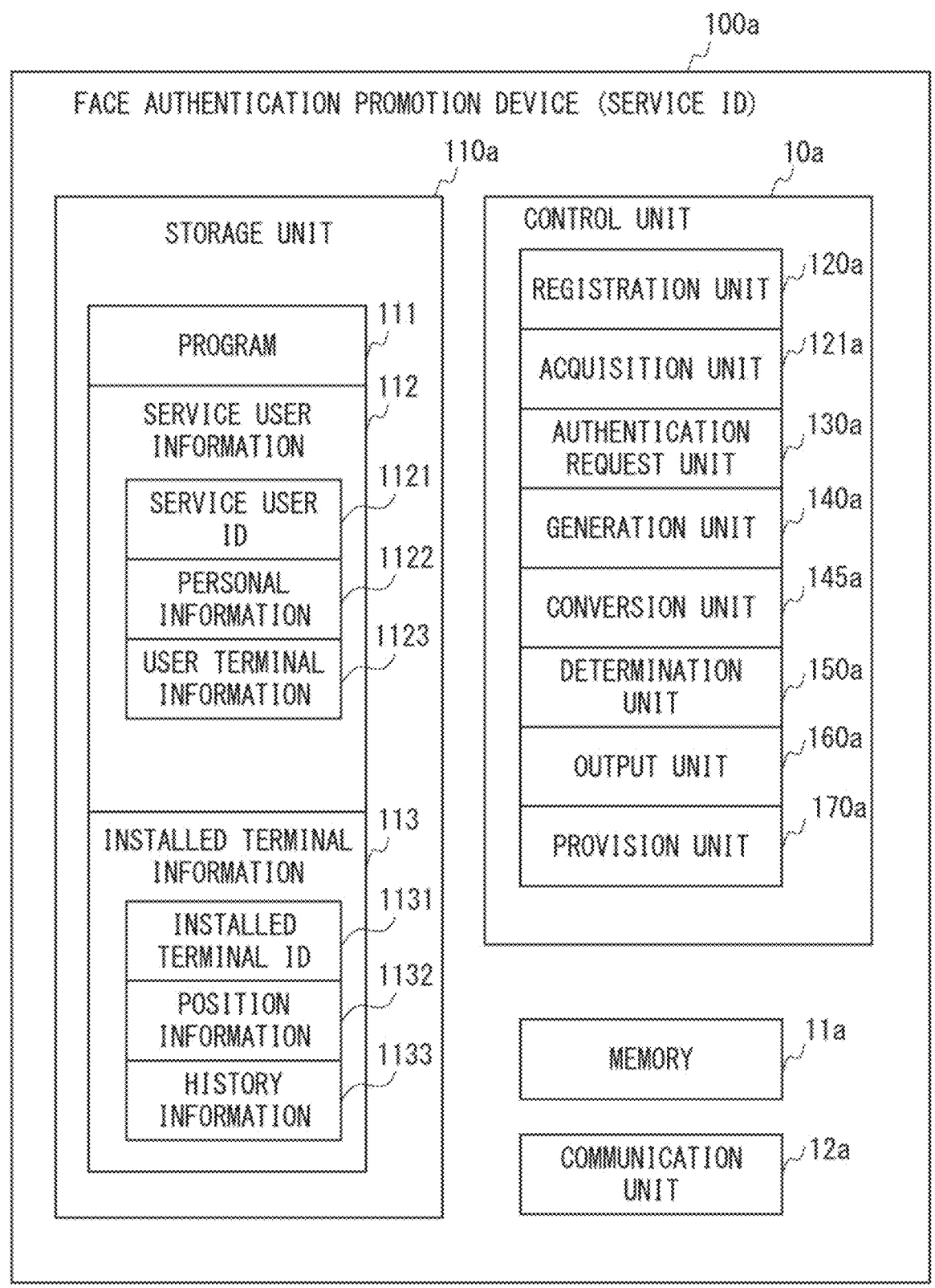
FIG. 8 is a block diagram showing the configuration of the face authentication promotion device according to the third example embodiment.

FIG. 8 is a block diagram showing a configuration of the face authentication promotion device 100a.

The face authentication promotion device 100a is an information processing device (e.g., server implemented by a computer) used by a service provider using the authentication device 200 (details of the authentication device 200 will be described later). The face authentication promotion device 100a is also referred to as a service delivery device. The service provider is assigned a service ID. A user using the service inputs a user ID and the personal information to the face authentication promotion device 100a, for example, via the user terminal. The face authentication promotion device 100*a* transmits the user ID and the service ID to the authentication device 200. The face authentication promotion device 100*a* performs processing for registering the user and the like, and processing for authenticating the user and the like for the authentication device. The authentication device generates a service user ID from the user ID and the service ID and returns it to the face authentication promotion device.

The face authentication promotion device 100*a* includes a control unit 10*a*, a memory 11*a*, a communication unit 12*a*, and a storage unit 110*a*. Note that the face authentication promotion device 100*a* according to this example embodiment is one specific example of the information processing device 100 according to the first or second example embodiment.

The control unit 10*a* is a control device that controls an operation of the face authentication promotion device 100*a* and is composed of, for example, a processor such as a CPU. The memory 11*a* is a storage area for temporarily storing processing contents of the control unit 10*a*, and is a volatile storage device such as RAM. The control unit 10*a* reads a program 111 from the storage unit 110*a* into the memory 11*a* and executes various processing. Specifically, the control unit 10*a* functions as a registration unit 120*a*, an acquisition unit 121*a*, an authentication request unit 130*a*, a generation unit 140*a*, a conversion unit 145*a*, a determination unit 150*a*, an output unit 160*a*, and a provision unit 170*a*.

The storage unit 110*a* includes a program 111, service user information 112, and installed terminal information 113. The service user information 112 includes a service user ID 1121, personal information 1122 associated with the service user ID 1121, and user terminal information 1123 associated with the service user ID. The installed terminal information 113 includes an installed terminal ID 1131 unique to one or more installed terminals used by the service provider, position information 1132 indicating a position of the installed terminal associated with the installed terminal ID, and history information about face authentication associated with the user ID and the installed terminal ID. The history information about face authentication indicates when and which user and with which installed terminal, the face authentication is performed. The personal information 1122 includes, for example, name, affiliation, email address, date of birth, account number, credit card number, electronic money information, payment method, etc.

The acquisition unit 121*a* acquires the user's face image and the user's personal information from the user terminal 300. The acquisition unit 121*a* acquires the user's face image captured by the camera of the installed terminal 400 at the time of face authentication and the time information about a time when the user's face image is captured. The acquisition unit 121*a* can acquire the position information about the user terminal. When the face authentication of the user captured by the installed terminal is successful, the acquisition unit 121*a* can acquire the time information at the installed terminal. Furthermore, the acquisition unit 121*a* can acquire these pieces of information for a plurality of users. The control unit 10*a* can also compare the time information about the plurality of users to determine if one user has succeeded in the face authentication at a particular installed terminal earlier than the other users.

The registration unit 120*a* registers the face image of the user associated with the service user ID in the storage unit 110*a*. The registration unit 120*a* registers the user's face image or face feature information based on the user's face image to the authentication device 200 in association with the service user ID.

The authentication request unit 130*a* acquires the captured image of the user taken by using the camera 410 of the installed terminal 400 via the network, transmits it to the authentication device 200, and requests the authentication device 200 to perform face authentication by using the face feature information about the captured image.

The generation unit 140*a* generates the route information about the user based on the position information about one or more installed terminals for which the face authentication has been successful and the acquired time information at the one or more installed terminals. Furthermore, the generation unit 140*a* can generate the route information for a plurality of users. The route information includes the position information about the one or more installed terminals and the time information about a time when face authentication has been performed at the installed terminal. For example, the route information may be the position information about the installed terminal that is to be a destination and a time when the face authentication has been performed at the installed terminal. Alternatively, the route information may be the position information about a first installed terminal, the position information about a second installed terminal, and a time when face authentication has been performed at each of the installed terminals.

The conversion unit 145*a* converts the generated route information into a score. The conversion unit 145*a* may convert the route information into a higher score if the route information follows a predefined route. The conversion unit 145*a* may convert the route information into a higher score if the route information includes the position information about a specific installed terminal. The conversion unit 145*a* may convert the route information into a higher score if the route information includes the position information about a specific installed terminal and the time information at the specific installed terminal is within a predetermined period of time. The conversion unit 145*a* may convert the route information into a higher score if the user's route information includes the position information about a specific installed terminal and when the time indicated by the time information at the specific installed terminal is earlier than the time indicated by the time information about other users.

The determination unit 150*a* determines the privilege for the user based on the route information or the converted score. The privileges for the user may be in various forms, such as tangible objects including prizes or intangible objects including useful information (details thereof will be described later). For example, if the route information includes a predefined route (e.g., route using certain route, a mandatory installed terminal, and predetermined means of transportation), the determination unit 150*a* may determine the privilege for the user. If the route information includes the position information about a predefined installed terminal (e.g., installed terminal defined as a destination) and the time information acquired by the installed terminal satisfies a predetermined condition, the determination unit may determine the privilege for the user. More specifically, if the route information includes a predefined installed terminal (e.g., installed terminal defined as a destination) and the time information acquired at the installed terminal indicates a time within a predetermined period of time, the determination unit may determine the privilege for the user. Furthermore, when the route information includes a predefined installed terminal (e.g., installed terminal defined as a destination), the determination unit may determine the privilege for the user based on a result of the comparison between the time information about the user acquired at the predefined installed terminal and the time information about other users (e.g., the arrival of the user at the installed terminal is among the first three arrivals). The determined privilege is stored in the storage unit in association with the service user ID.

The output unit 160a can output the privilege for the user or the information about the privilege to the user terminal 300 or the installed terminal 400. The output unit 160a can also output the above-described converted scores. In addition, when the accumulated scores reach a predetermined value, the output unit 160a may output a privilege according to the accumulated scores (details will be described later) or information about the privilege. Furthermore, the output unit 160a can output map information about the vicinity of the installed terminal that has been subjected to face authentication to the installed terminal or the user terminal. Alternatively, the output unit 160a can output the position information about the user terminal acquired by the acquisition unit 121a to the user terminal, together with the map information about the vicinity of the installed terminal that has been successful in the face authentication most recently.

The provision unit 170a instructs each service provider to provide services through the installed terminal according to the success or failure of the face authentication. For example, if the installed terminal is a gate device, the provision unit 170a can instruct the installed terminal to open a gate when face authentication is successful. When the installed terminal is installed in a hotel, the provision unit 170a can instruct the installed terminal to perform check-in processing by using the personal information acquired from the authentication device when the face authentication is successful.

The communication unit 12a is an interface for performing communication with the outside of the face authentication promotion device. The communication unit 12a is used to communicate with other network node devices that constitute the face authentication promotion system. The communication unit 12a may be used to perform wireless communication. For example, the communication unit 12a may be used to perform wireless LAN communication defined in the IEEE 802.11 series or mobile communication defined in 3GPP (3rd Generation Partnership Project). Alternatively, the communication unit 12a may include, for example, a network interface card (NIC) conforming to the IEEE 802.3 series.

Figure 9:
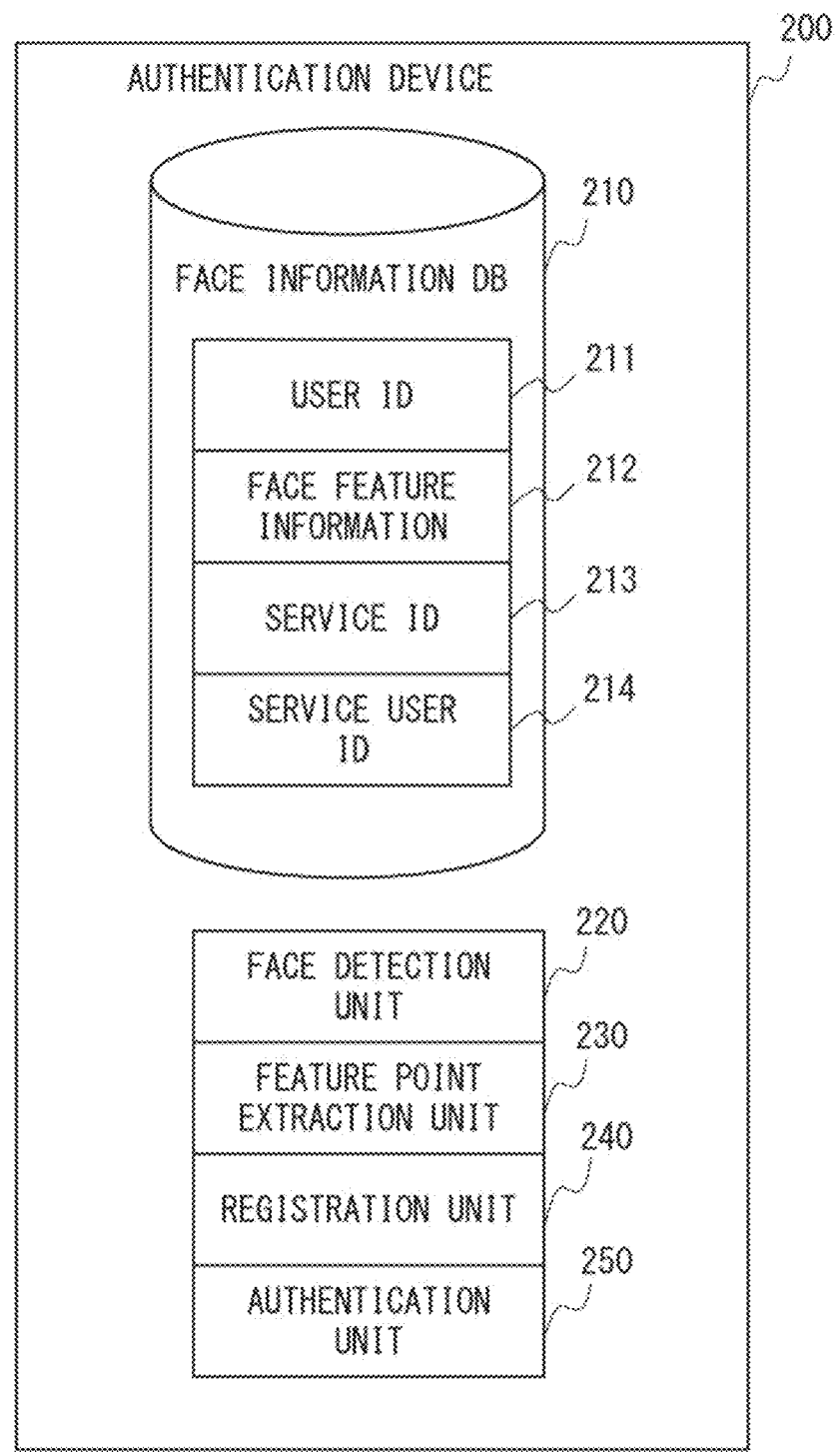
FIG. 9 is a block diagram showing a configuration of an authentication device according to the third example embodiment.

FIG. 9 is a block diagram showing a configuration of the authentication device 200. The authentication device 200 includes a face information DB 210, a face detection unit 220, a feature point extraction unit 230, a registration unit 240, and an authentication unit 250.

The face information DB 210 stores the user ID and the face feature information about the user in association with each other. The face information DB 210 also stores a service user ID 214 generated when the authentication device 200 receives the user ID and the service ID in association with a service ID 213 that is unique to the service provider using face authentication. The face information DB 210 is also known as a storage unit. When the authentication device 200 receives the user ID and the service ID from a request source (e.g., the face authentication promotion device 100a), it generates the service user ID and returns it to the request source. In response to a face authentication request received from the request source (e.g., the face authentication promotion device 100a), the authentication device 200 compares the face image included in the request with the face feature information for each user, and returns a result of the comparison (success or failure of face authentication) to the request source.

The face detection unit 220 detects a face area included in a registered image for registering face information and outputs it to the feature point extraction unit 230. The feature point extraction unit 230 extracts feature points (e.g., eyes, nose, mouth, etc.) from the face area detected by the face detection unit 220, calculates the distance of each feature point as a feature amount, and outputs the face feature information to the registration unit 240. Here, the face feature information is a set of extracted feature points. The feature point extraction unit 230 extracts the feature points included in the face image received from the face authentication promotion device 100a and outputs the face feature information to the authentication unit 250.

The registration unit 240 issues a new user ID when registering the face feature information. The registration unit 240 registers the issued user ID and face feature information extracted from the registered image in the face information DB 210 in association with each other. Furthermore, when the registration unit 240 receives the user ID and the service ID from the request source (e.g., the face authentication promotion device 100a), it generates the service user ID and returns it to the request source. The authentication unit 250 compares the face feature information extracted from the face image (captured image) with the face feature information in the face information DB 210. The authentication unit 250 returns whether or not the two pieces of the face feature information match to the face authentication promotion device 100a. Whether or not two pieces of the feature information matches corresponds to the success or failure of the authentication.

Figure 10:
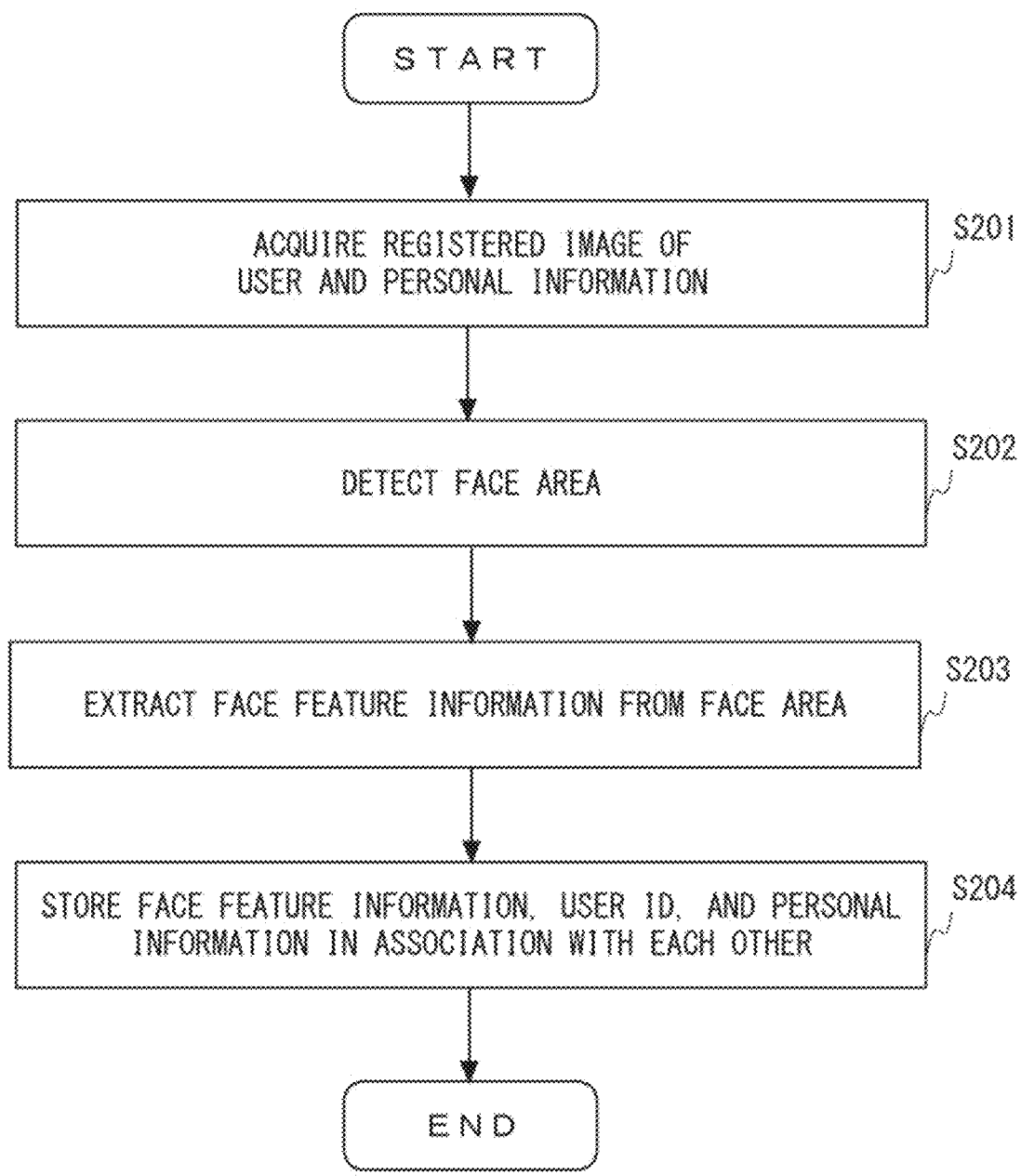
FIG. 10 is a flowchart showing a flow of face information registration processing according to the third example embodiment.

FIG. 10 is a flowchart showing a flow of face information registration processing by the authentication device 200. First, the authentication device 200 acquires the registered image of the user included in the face information registration request (Step S201). For example, the authentication device 200 accepts the face information registration request from the face authentication promotion device 100a via the network 500. Next, the face detection unit 220 detects the face area included in the registered image of the user (Step S202). Next, the feature point extraction unit 230 extracts the feature points from the face area detected in Step S202 and outputs the face feature information to the registration unit 240 (Step S203). Finally, the registration unit 240 issues a user ID and registers the user ID, the face feature information, and personal information in the face information DB 210 in association with each other (Step S204). Here, the issued user ID may be associated with the personal information obtained in advance, for example, name, affiliation, email address, date of birth, and combinations thereof. The authentication device 200 may receive the face feature information from the user terminal or the like and register it in the face information DB 210 in association with the user ID. The user ID is also sent to the face authentication promotion device 100a and stored as user information. The user ID may also be transmitted to and stored in the user terminal 300 and installed terminal 400.

Figure 11:
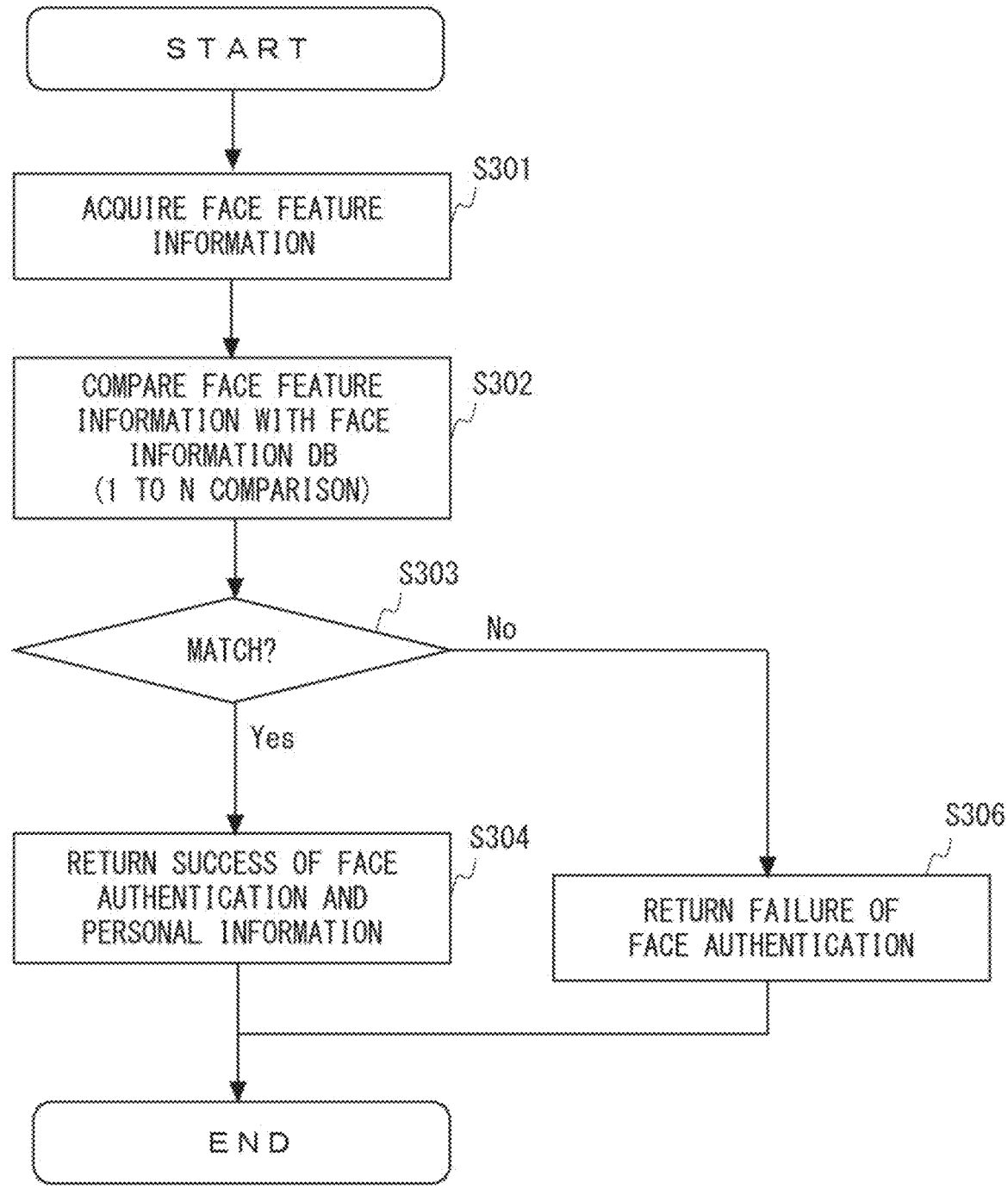
FIG. 11 is a flowchart showing a flow of face authentication processing according to the third example embodiment.

FIG. 11 is a flowchart showing a flow of face authentication processing by the authentication device 200. First, the feature point extraction unit 230 acquires the face feature information from the face image (captured image) received from the face authentication promotion device 100a (Step S301). For example, the authentication device 200 receives the face image (captured image) from the face authentication promotion device 100a and extracts face feature information as in Steps S201 to S203. Alternatively, the authentication device 200 may receive the facial feature information from the face authentication promotion device 100a. Next, the authentication unit 250 compares the face feature information about the acquired captured image with the face information DB 210 (Step S302). Such authentication is also known as 1-to-N authentication. In order to improve the accuracy of the comparison, instead of comparing all pieces of the image data in the face information DB 210, the registered image associated with the user ID may be compared with the face feature information about the acquired captured image. In this case, for example, the user may be asked to input his/her user ID via a touch panel of the installed terminal. Alternatively, by reading the identification code (e.g., QR code (registered trademark)) displayed on the installed terminal through the user terminal associated with the user ID, the installed terminal 400, the face authentication promotion device 100a, and the authentication unit 250 can recognize the user ID. When the two pieces of the face feature information match (Yes in Step S303), the authentication unit 250 specifies the user ID of the user whose face feature information matches the face feature information in the face information DB 210 (Step S304), and returns a success of the face authentication and the specified user ID to the face authentication promotion device 100a (Step S305). If there is no matching face feature information (No in Step S303), the authentication unit 250 returns a failure of the face authentication to the face authentication promotion device 100a (Step S306).

Figure 12:
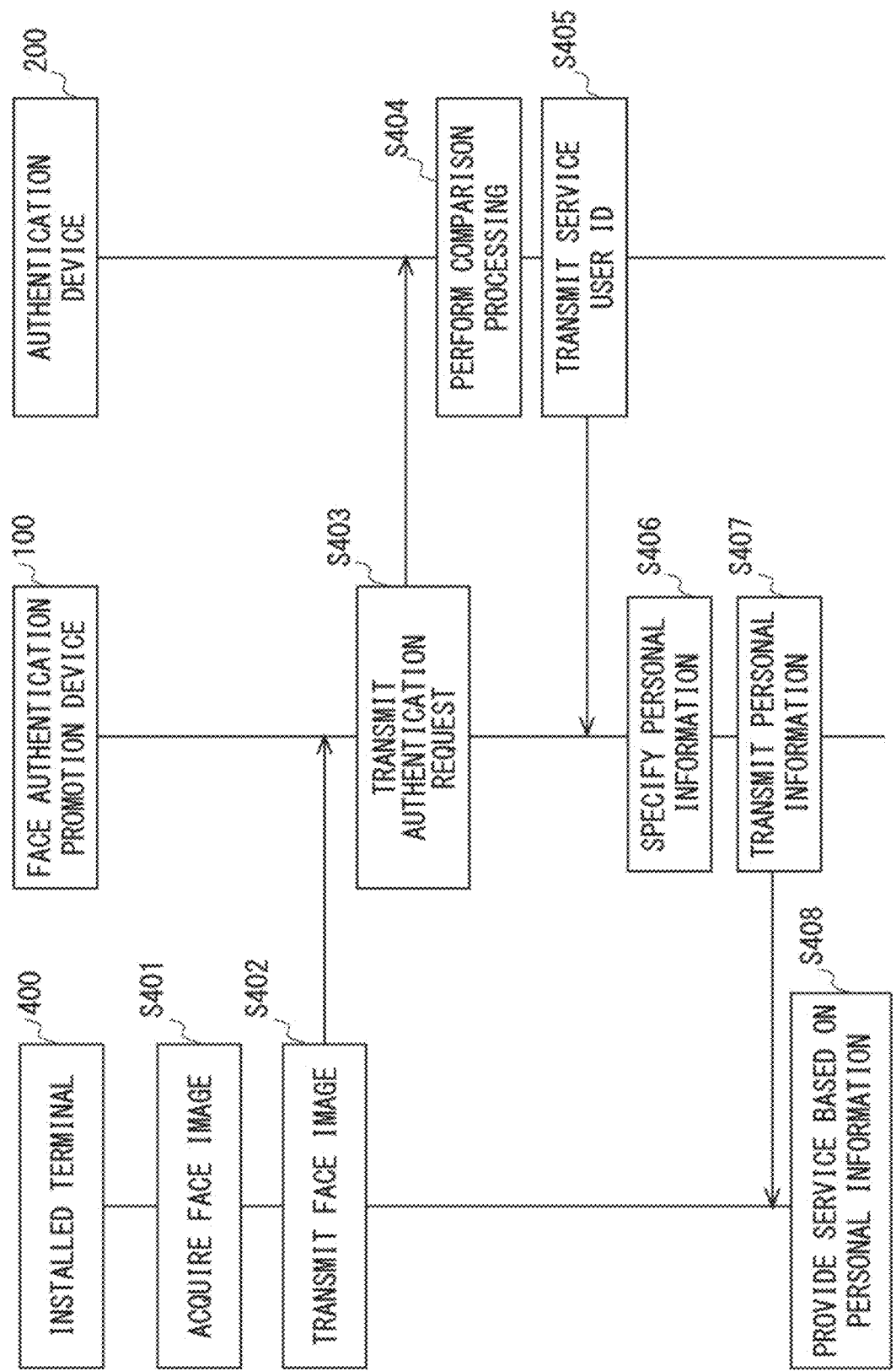
FIG. 12 is a sequence diagram showing an overall operation of the face authentication promotion system according to the third example embodiment.

FIG. 12 is a sequence diagram showing an overall operation of the face authentication promotion system according to the third example embodiment.

The installed terminal 400 acquires a face image of the user by activating the camera (Step S401). The installed terminal 400 transmits the acquired face image of the user to the face authentication promotion device 100 via the network (Step S402). The face authentication promotion device 100 transmits a face authentication request for the face image to the authentication device 200 (Step S403). The authentication device 200 performs processing for comparing the face image with a plurality of pre-registered images (Step S404). Upon successful face authentication, the authentication device 200 specifies the service user ID for the face image and transmits it to the face authentication promotion device 100a (Step S405). The face authentication promotion device 100a specifies the personal information about the user from the service user ID (Step S406) and transmits the personal information to the installed terminal 100 (Step S408). The installed terminal 100 provides predetermined services (e.g., face authentication payments, etc.) based on the personal information.

Figure 13:
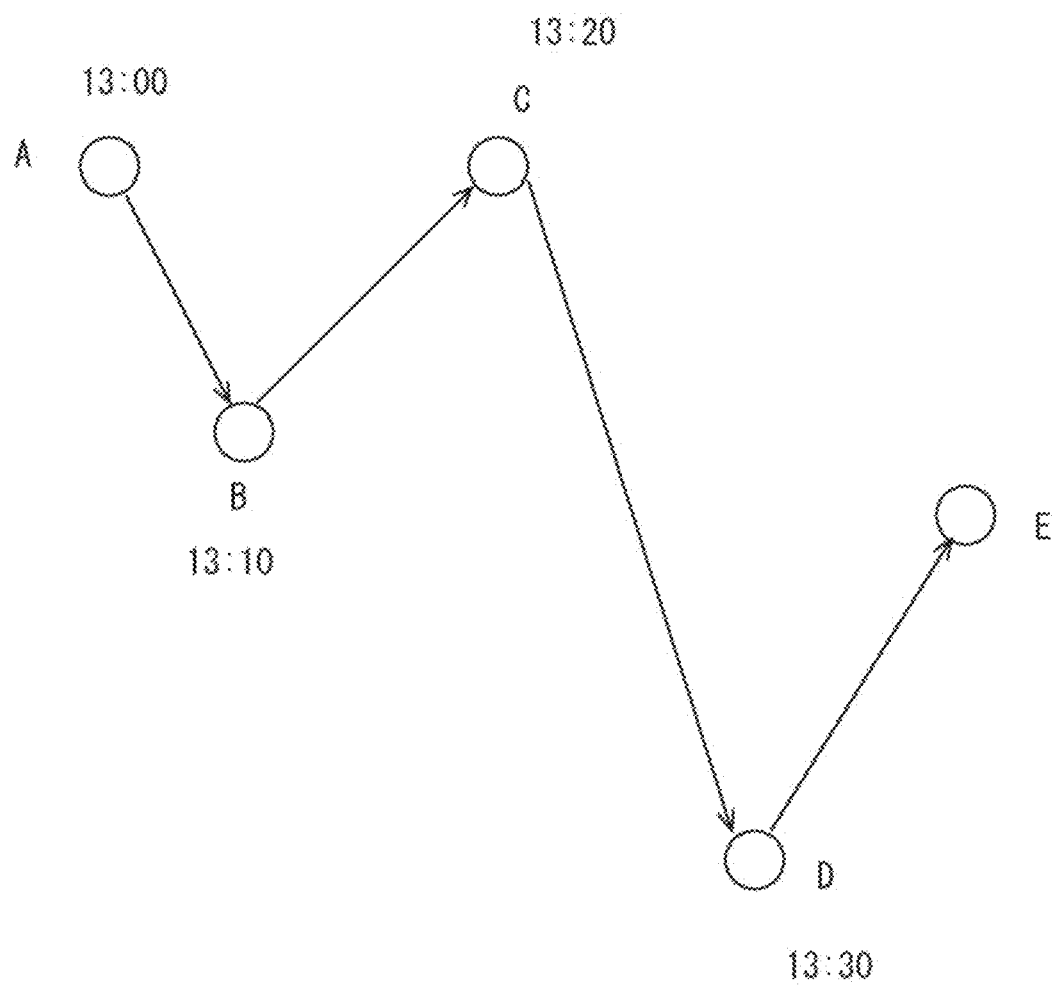
FIG. 13 is a diagram for explaining an example of an arrangement of installed terminals for performing face authentication according to the third example embodiment.

FIG. 13 is a diagram for explaining an example of an arrangement of the installed terminals for performing face authentication.

An example in which a plurality of installed terminals are arranged in a specific area to promote a plurality of users to use face authentication will be described. Installed terminals 400a, 400b, 400c, 400d, and 400e are installed at points A, B, C, D, and E, respectively. Here, an event (e.g., an event such as a stamp rally in which users visit different locations to collect stamps) where the plurality of users start at the same time and move from a predetermined starting point to a predetermined destination along a predefined route (A-E) shall be considered. Each user recognizes the predefined route by consulting a map on the user terminal or a distributed paper map, and moves to the destination while receiving a service (e.g., face authentication payment, entry and exit through face authentication, boarding and exiting through face authentication, etc.) provided at each installed terminal by means of successful face authentication at each installed terminal along the route. Each installed terminal has a time limit, and each user is required to be subjected to face authentication at a corresponding installed terminal within the time limit. The predetermined route may require the user to move by predetermined means of transportation (e.g., train or bus of a predetermined railway company). Also, some of the installed terminals may be set as mandatory. In this way, the score or privilege imparted to the user is determined based on the authentication time at the installed terminal and the route information.

The privileges may be in various forms, such as tangible objects including prizes or intangible objects including useful information. The useful information may be a fictional character that can be displayed at the user terminal. The fictional character may change or grow in stages. In addition, the face image of the user captured by the camera of the installed terminal may be processed in a predetermined manner (e.g., by combining the face image of the user with the character).

The generated route information can be converted into a score as follows. For example, the route information may be converted into a higher score if the route information follows a predefined route. Alternatively, the route information may be converted into a higher score if the route information includes position information about a particular installed terminal. Further alternatively, the route information may be converted into a higher score if the route information includes position information about a specific installed terminal and the time information at the specific installed terminal indicates a time within a predetermined period of time. Still further alternatively, the route information may be converted into a higher score if the user's route information includes the position information about a particular installed terminal, and the time information at that particular installed terminal is earlier than the time indicated by the time information about other users. In still one more alternative, the route information may be converted into a higher score if predetermined means of transportation is used on a predetermined route. The greater the number of installed terminals for which the authentication is successful, the higher the score the route information may be converted into. The earlier the expiration time of the time limit at the installed terminal, the higher the score the route information may be converted into. On the other hand, the longer the time by which the limit at the installed terminal is exceeded, the lower the score the route information may be converted into.

In this way, the event is intended for the user to walk around across the plurality of installed terminals and to be subjected to face authentication.

When the user is required to move between predetermined routes by predetermined means of transportation (e.g., train of a predetermined railway company), an installed terminal using face authentication may be provided at a ticket gate of the transportation. Alternatively, it may be determined that the user has used the predetermined means of transportation by linking the face authentication promotion system with a transportation IC card (e.g., SUICA (registered trademark)) issued by each transportation.

Figure 14:
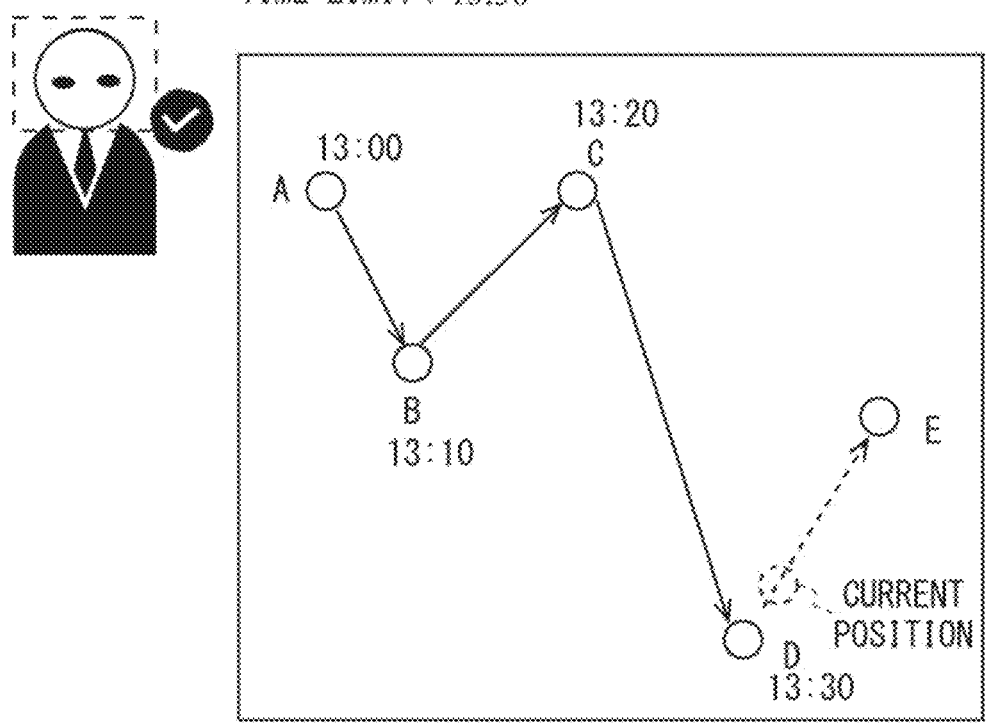
FIG. 14 is a diagram for explaining an example of a screen displayed on a user terminal or installed terminal.

FIG. 14 shows an example of a screen displayed on a user terminal or installed terminal.

FIG. 14 shows a screen when the user succeeded in face authentication at positions A-C (the installed terminals 400a, 400b, and 400c) and then at the installed terminal 400d. The current position can be displayed on the user terminal that can receive GPS. As described above, the user terminal 300 includes the position information acquisition unit 354, so that the user can check his/her position through a display unit of the user terminal 300 even while moving from the installed terminal on which face authentication has been successful to the next installed terminal. On the screen, an image including the user's face, which is captured during authentication, appears with a mark indicating successful authentication. The map shows the positions (A, B, C, and D) and times (13:00, 13:10, 13:20, and 13:30) at which the installed terminals 400a, 400b, 400c, and 400d have been succeeded in the face authentication so far. The position (E) of the next installed terminal 400 near the position (D) of the installed terminal 400d is also shown, and a route to the position (E) of the next installed terminal is also shown. The map also shows that a distance to the position (E) of the next installed terminal is 100 m and that the time limit is 13:50. By looking at these screens, the user can see the previous route information and the route to the next installed terminal and is motivated to reach the next installed terminal and is subjected to face authentication. In addition, after the user completes such event, the users can earn privileges determined based on the route and time information.

In the above example, a single route is shown as the predefined route, but a plurality of different route may be set. The time limit at the installed terminal may also be changed for different routes. The privileges that the users can earn may be changed for different routes. Furthermore, the available transportation may be changed for different routes. The position information about a plurality of users may be acquired, and such position information may be output to the user terminals or installed terminals so that each user can check each other's positions. In this case, the plurality of users are displayed with different marks on the screen shown in FIG. 14. In addition, in FIG. 14, the distance from the current position to the next installed terminal, the distance between each of the installed terminals, the time required for normal walking, the direction, and the route may be displayed as well.

Figure 15:
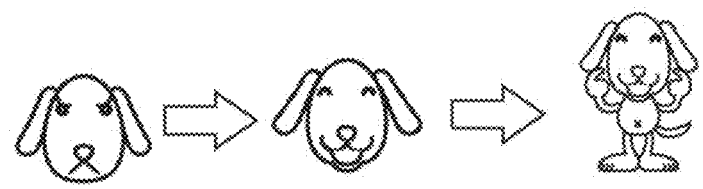
FIG. 15 is a diagram for explaining a change or growth of a character.

As a privilege given to the user, a fictitious character is set for the user terminal (e.g., smartphone). When the user is subjected to face authentication at the installed terminal, the character changes and grows. For example, the fictitious character is set for the installed terminals (in the above example, the installed terminals 400a, 400b, 400c, 400d, and 400e) in a specific area. Different characters may be set in different places. In addition, according to the above-described route information and points acquired by the installed terminal, the character can change and grow as shown in FIG. 15. For example, a character may be configured in such a way that it grows stepwise at each predetermined point (e.g., 50 points). When the user is subjected to face authentication at the installed terminal, he/she may select one character from among a plurality of characters that can be acquired at the installed terminal. This motivates the user to join and continue games that use face authentication.

Figure 16:
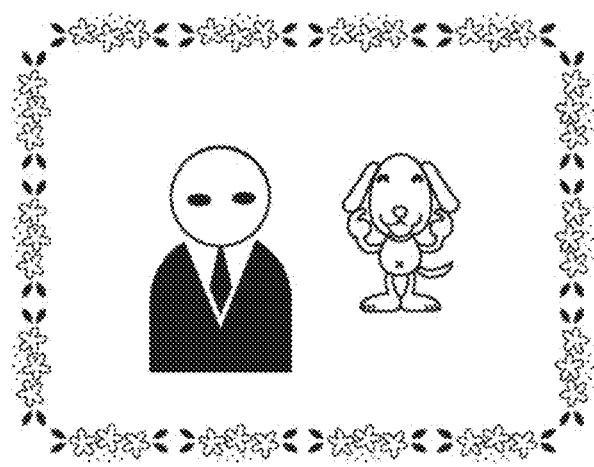
FIG. 16 is a diagram for explaining an example of a composite photo of a character and a user.

As another privilege given to the user, when the user uses the installed terminal, a composite photo of the character and the user can be acquired as shown in FIG. 16. When the user uses the face authentication function of the installed terminal, a face image of the user is acquired. This face image is then combined with the character at that time. The composite photo data may be generated at the installed terminal and transmitted directly from the installed terminal to the user terminal. Alternatively, the composite photo data may be transmitted from the installed terminal to the user terminal via the face authentication promotion device. The composite photo data may be imported into the user terminal by scanning a QR code (registered trademark) displayed on the installed terminal by using the user terminal. In addition, an application on the user terminal (smartphone) can acquire a picture frame of a fictitious character and use that picture frame to take a picture by means of the smartphone. In this way, the face image captured based on face authentication can also be used as a privilege for the user.

As another privilege given to users, users may register their interested celebrities in the system in advance, and when they use the installed terminal, they can acquire goods, information (undisclosed information), and rights (handshake event tickets and priority ticket acquisition) related to the celebrities. More points earned through face authentication may be used to provide more valuable privileges to users.

As another privilege given to users, users may earn coupons or points when they use the installed terminal. The users can use the coupons and points at companies participating in the authentication system.

The users can also obtain information about these privileges or information about the privileges through their own user terminals.

According to the third example embodiment described above, the use of face authentication can be promoted by further motivating users to use face authentication and to continue using it. In addition, by using a captured image of a user used for face authentication as a privilege for the user, a comprehensive and integrated service can be achieved without any additional burden on the service provider. In addition, service providers can also promote a variety of services using face authentication (e.g., payment through face authentication, entry and exit through face authentication, check-in and check-out through face authentication, etc.).

Fourth Example Embodiment

In the above described third example embodiment, the face authentication promotion device 100a is described as a server device, but some of the functions of the face authentication promotion device 100a may be implemented in the installed terminal 400.

Figure 17:
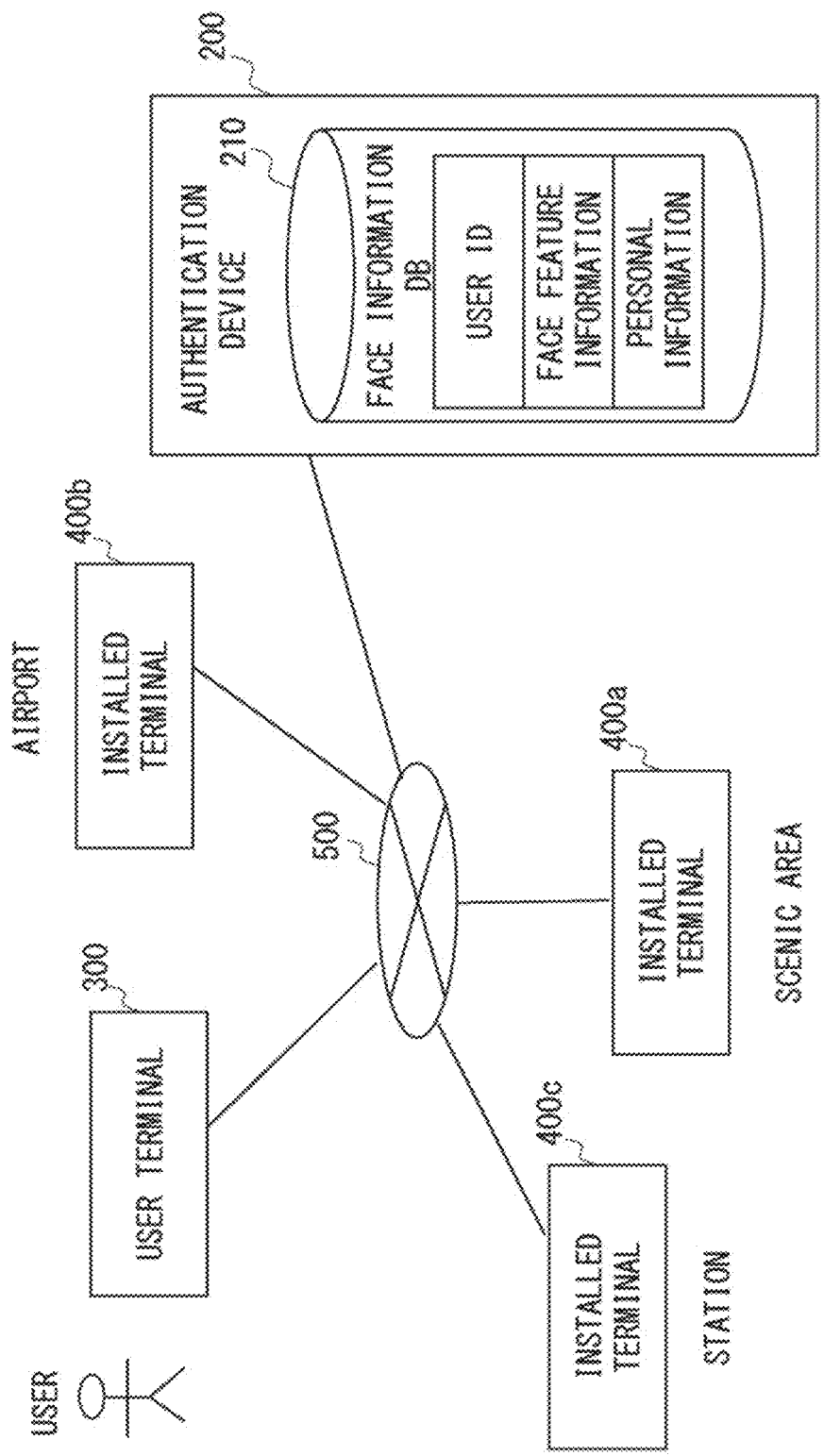
FIG. 17 is a block diagram showing a configuration of a face authentication promotion system according to a fourth example embodiment.

FIG. 17 is a block diagram showing a configuration of a face authentication promotion system according to a fourth example embodiment. The face authentication promotion system according to this example embodiment includes an authentication device 200, a user terminal 300, and one or more installed terminals 400 (400a to 400c).

Figure 18:
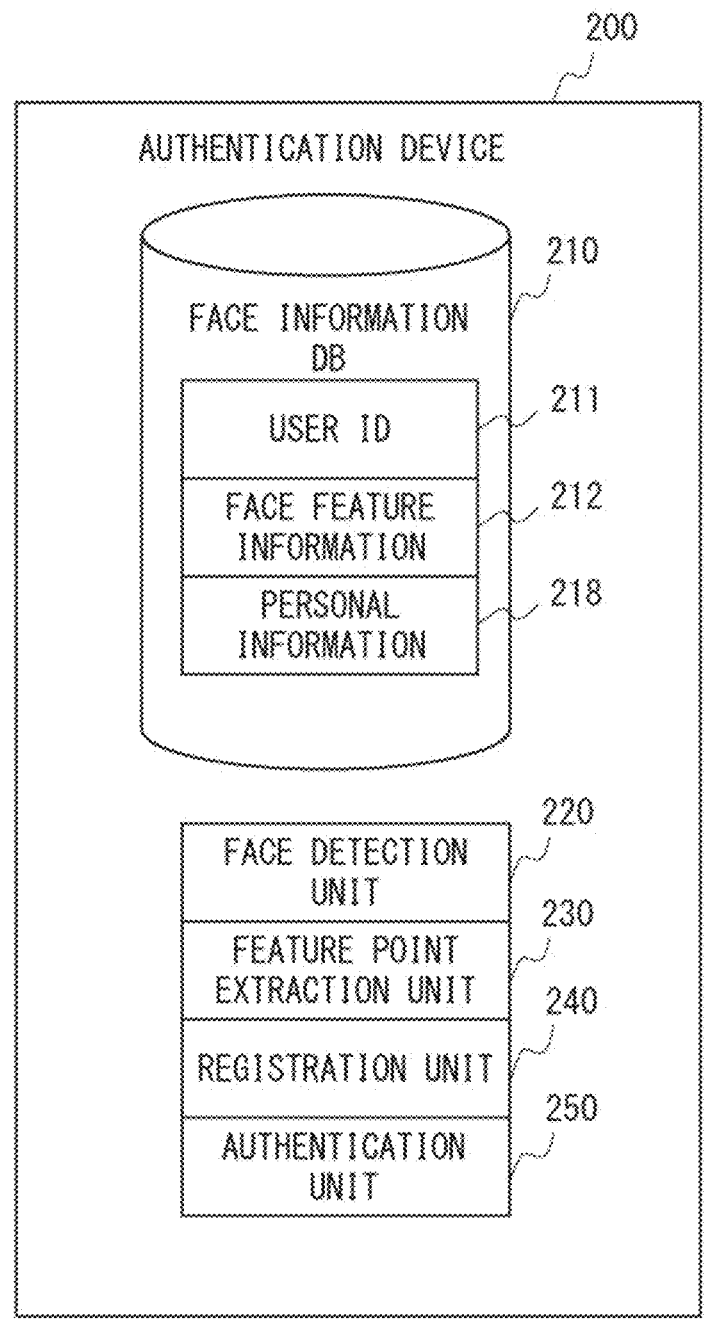
FIG. 18 is a block diagram showing a configuration of an authentication device according to the fourth example embodiment.

FIG. 18 is a block diagram showing a configuration of the authentication device 200 according to the fourth example embodiment. The authentication device 200 includes personal information 218 associated with a user ID 1121. The personal information includes, for example, name, affiliation, email address, date of birth, account number, credit card number, and combinations thereof.

Figure 19:
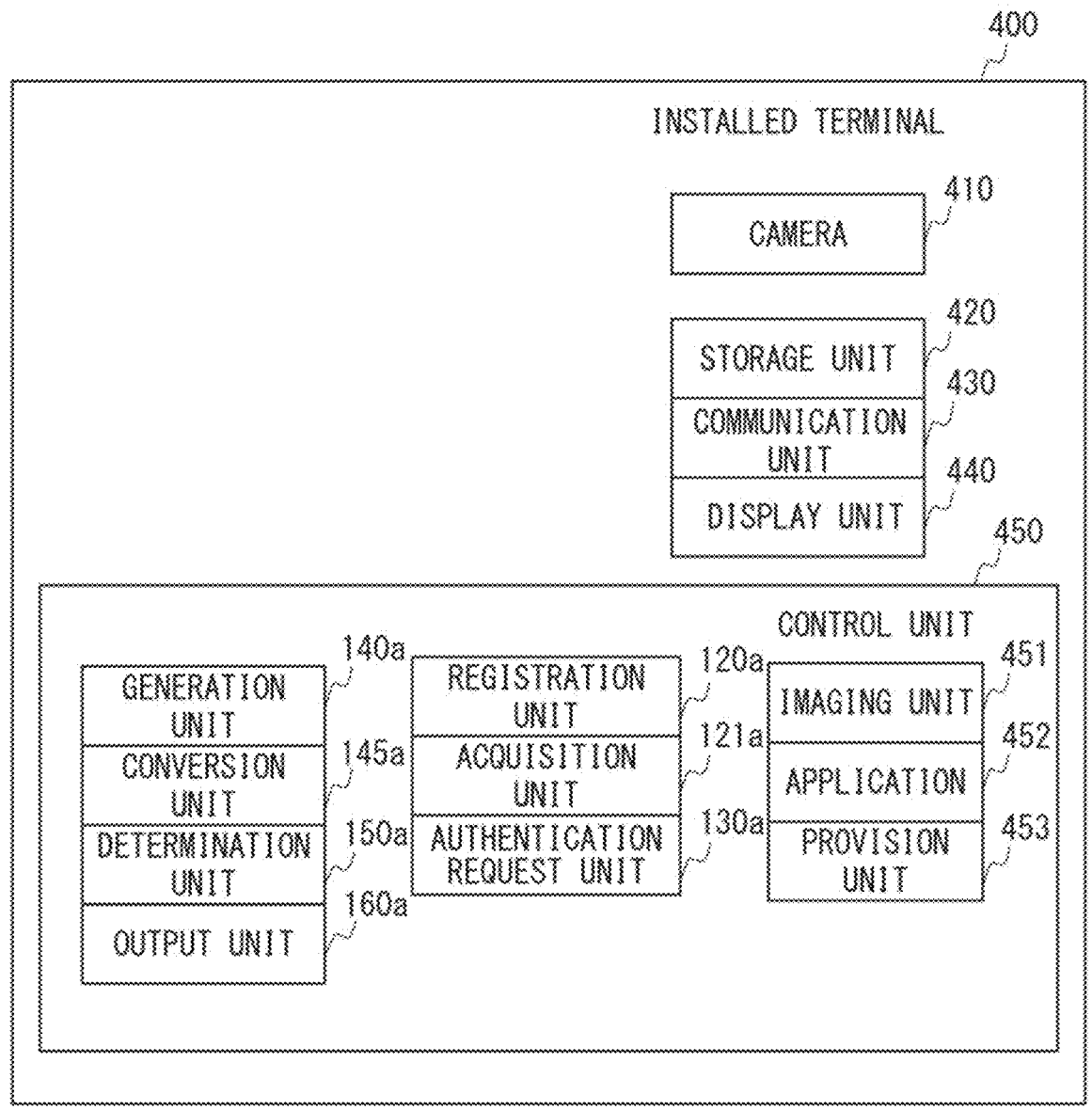
FIG. 19 is a block diagram showing a configuration of an installed terminal according to the fourth example embodiment.

FIG. 19 is a block diagram showing a configuration of the installed terminal. The installed terminal 400 according to this example embodiment has some of the functions of the control unit of the face authentication promotion device 100a according to the third example embodiment. That is, the control unit 450 includes an imaging unit 451, an application 452, a provision unit 453, a registration unit 120a, an acquisition unit 121a, an authentication request unit 130a, a generation unit 140a, a conversion unit 145a, a determination unit 150a, and an output unit 160a. The installed terminal 400 according to this example embodiment is one specific example of the information processing device 100 according to the first or second example embodiment.

The installed terminal 400 captures a face image of the user and transmits it to the authentication device 200. The authentication device 200 performs comparison processing using the face image. The authentication device 200 transmits personal information to the installed terminal 400 as needed. If the authentication device includes a plurality of databases, the authentication device can use the user ID to coordinate the databases.

When the installed terminal is a gate device, it can open and close a gate when a result of authentication obtained from the authentication device is successful without using personal information. On the other hand, when the installed terminal is disposed in a hotel and has a check-in function, the check-in processing can be executed based on the result of successful authentication and personal information from the authentication device.

In the above example, the program can be stored and provided to a computer using any type of non-transitory computer readable media. Non-transitory computer readable media include any type of tangible storage media. Examples of non-transitory computer readable media include magnetic storage media, optical magnetic storage media (e.g. magneto-optical disks), CD-ROM (Read Only Memory), CD-R, CD-R/W, and semiconductor memories. The magnetic storage media may be floppy disks, magnetic tapes, hard disk drives, etc. The semiconductor memories may be mask ROM, PROM (Programmable ROM), EPROM (Erasable PROM), flash ROM, RAM (Random Access Memory), etc. The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This disclosure is not limited to the above example embodiments and may be changed as appropriate without departing from the purport. The plurality of examples described above can also be performed in combination as appropriate.

The whole or part of the example embodiments disclosed above can be described as, but not limited to, the following supplementary notes.

Supplementary Note 1

An information processing device comprising:
an authentication request unit configured to cause biometric authentication to be performed on biometric information about a user acquired by one or more installed terminals arranged in various places to be compared with biometric information about registered users;
an acquisition unit configured to acquire time information about a time when the biometric authentication has been successful;
a generation unit configured to generate route information about the user based on position information about the one or more installed terminals for which the biometric authentication has been successful and the time information about the time when the biometric authentication has been successful; and
a determination unit configured to determine a privilege for the user based on the route information.

Supplementary Note 2

The information processing device according to Supplementary note 1, wherein
when the route information includes a predefined route, the determination unit determines the privilege for the user.

Supplementary Note 3

The information processing device according to Supplementary note 2, wherein
the predefined route includes a route for which predetermined means of transportation is used.

Supplementary Note 4

The information processing device according to Supplementary note 1, wherein
the determination unit determines the privilege for the user when the route information includes the position information about a predefined installed terminal and the time information acquired at the installed terminal satisfies a predetermined condition.

Supplementary Note 5

The information processing device according to Supplementary note 4, wherein
the determination unit determines the privilege for the user when the route information includes a predefined installed terminal and the time information acquired at the installed terminal indicates a time within a predetermined period of time.

Supplementary Note 6

The information processing device according to Supplementary note 4, wherein
when the route information includes a predefined installed terminal, the determination unit determines the privilege for the user based on a result of a comparison between the time information about the user acquired by the installed terminal and the time information about another user.

Supplementary Note 7

The information processing device according to any one of Supplementary notes 1 to 6, wherein
the biometric authentication is face authentication in which a face image of the user captured by a camera of the installed terminal is compared with a registered face image of the user, and
the privilege for the user is an image obtained by performing predetermined processing on the face image of the user captured by the camera of the installed terminal.

Supplementary Note 8

The information processing device according to Supplementary note 7, wherein the privilege for the user is a composite image obtained by combining a character determined based on the route information with the captured face image of the user.

Supplementary note 9

The information processing device according to any one of Supplementary notes 1 to 8, further comprising:
an output unit configured to output the privilege for the user.

Supplementary Note 10

The information processing device according to any one of Supplementary notes 1 to 9, further comprising:
a position information acquisition unit configured to acquire the position information about the user from a user terminal owned by the user; and
an output unit configured to output, to the user terminal, the position information indicating positions of one or more of the plurality of installed terminals together with the position information about the user.

Supplementary Note 11

A face authentication promotion system comprising:
a camera configured to capture a user;
the information processing device according to any one of Supplementary notes 1 to 9;
a position information acquisition unit configured to acquire position information about one or more user terminals owned by the user; and
an authentication device configured to execute processing for comparing a captured face image of the user with a pre-registered registered image.

Supplementary Note 12

An information processing method comprising:
causing biometric authentication to be performed on biometric information about a user acquired by one or more installed terminals arranged in various places to be compared with biometric information about registered users;
acquiring time information about a time when the biometric authentication has been successful;
generating route information about the user based on position information about the one or more installed terminals for which the biometric authentication has been successful and the time information about the time when the biometric authentication has been successful; and
determining a privilege for the user based on the route information.

Supplementary Note 13

A non-transitory computer readable medium storing a program for causing a computer to execute:
processing of causing biometric authentication to be performed on biometric information about a user acquired by one or more installed terminals arranged in various places to be compared with biometric information about registered users;
processing of acquiring time information about a time when the biometric authentication has been successful;
processing of generating route information about the user based on position information about the one or more installed terminals for which the biometric authentication has been successful and the time information about the time when the biometric authentication has been successful; and
processing of determining a privilege for the user based on the route information.

REFERENCE SIGNS LIST

10a CONTROL UNIT
100 INFORMATION PROCESSING DEVICE
100a FACE AUTHENTICATION PROMOTION DEVICE
110 STORAGE UNIT
111 PROGRAM
112 USER INFORMATION
113 TERMINAL INFORMATION
120 REGISTRATION UNIT
121 ACQUISITION UNIT
130 AUTHENTICATION REQUEST UNIT
140 GENERATION UNIT
145 CONVERSION UNIT
150 DETERMINATION UNIT
160 OUTPUT UNIT
170 PROVISION UNIT
200 AUTHENTICATION UNIT
210 FACE INFORMATION DB
220 FACE DETECTION UNIT
230 FEATURE POINT EXTRACTION UNIT
240 REGISTRATION UNIT
250 AUTHENTICATION UNIT
300 USER TERMINAL
310 CAMERA
320 STORAGE UNIT
330 COMMUNICATION UNIT
340 DISPLAY UNIT
350 CONTROL UNIT
351 IMAGING UNIT
352 REGISTRATION UNIT
353 APPLICATION
354 POSITION INFORMATION ACQUISITION UNIT
400 INSTALLED TERMINAL
410 CAMERA
420 STORAGE UNIT
430 COMMUNICATION UNIT
440 DISPLAY UNIT
450 CONTROL UNIT
451 IMAGING UNIT
452 REGISTRATION UNIT
453 APPLICATION
454 PROVISION UNIT
500 NETWORK

The invention claimed is:
1. An information processing system comprising:
at least one memory storing instructions, and
at least one processor configured to execute the instructions to;
acquire a face image of a user with a camera of one or more installed terminals arranged in various places, the one or more installed terminals including one or more gate devices;
cause face authentication to be performed on face features extracted from the acquired face image to be compared with feature points extracted from a face image of registered user;

acquire time information about a time when the face authentication has been successful;

acquire position information about the one or more installed terminals for which the face authentication has been successful;

acquire position information about a user terminal of the user based on a signal received from a GPS receiver;

generate route information about the user based on the position information about the one or more installed terminals for which the face authentication has been successful, the position information of the user terminal of the user, and the time information about the time when the face authentication has been successful;

determine a privilege for the user based on the route information; and instruct the one or more installed terminals to provide services of each service provider through the installed terminal according to the success or failure of the face authentication;

instruct the gate device of the one or more installed terminals to open a gate associated with the gate device when the face authentication for the user is successful; and wherein the privilege includes an image obtained by performing predetermined processing on the face image of the user captured by the camera of the installed terminal, the predetermined processing comprises combining a character determined based on the route information with the captured face image of the user to obtain a composite image, and wherein the character changes in stages based on the route information.

2. The information processing system according to claim 1, wherein the at least one processor configured to determine the privilege for the user based on a result of a comparison between the time information about the user acquired by the installed terminal and the time information about another user when the route information, includes a predefined installed terminal and the time information acquired at the installed terminal indicates a time within a predetermined period of time.

3. The formation processing system according to claim 1, wherein the at least one processor configured to execute the instructions to determine the privilege for the user when the route information includes the position information about a predefined installed terminal and the time information acquired at the installed terminal satisfies a predetermined condition.

4. The formation processing system according to claim 1, wherein the at least one processor configured to execute the instructions to determine the privilege for the user when the route information includes a predefined installed terminal and the time information acquired at the installed terminal indicates a time within a predetermined period of time.

5. The information processing system according to claim 1, wherein when the route information includes a predefined installed terminal, the at least one processor configured to execute the instructions to determine the privilege for the user based on a result of a comparison between the time information about the user acquired by the installed terminal and the time information about another user.

6. The formation processing system according to claim 1, wherein: the at least one processor configured to execute the instructions to output the privilege for the user.

7. The formation processing system according to claim 1, wherein the at least one processor configured to execute the instructions to acquire the position information about the user from a user terminal owned by the user; and output, to the user terminal, the position information indicating positions of one or more of the plurality of installed terminals together with the position information about the user.

8. An information processing method comprising:

acquiring a face image of a user acquired with a camera of one or more installed terminals arranged in various places, the one or more installed terminals including one or more gate devices;

causing face authentication to be performed on face features extracted the acquired face image to be compared with feature points extracted from a face image of registered user;

acquiring time information about a time when the face authentication has been successful;

acquiring position information about the one or more installed terminals for which the face authentication has been successful;

acquiring position information about a user terminal of the user based on a signal received from a GPS receiver;

generating route information about the user based on the position information about the one or more installed terminals for which the face authentication has been successful, the position information of the user terminal of the user, and the time information about the time when the face authentication has been successful;

determining a privilege for the user based on the route information; and instructing the one or more installed terminals to provide services of each service provider through the installed terminal according to the success or failure of the face authentication;

instructing the gate device of the one or more installed terminals to open a gate associated with the gate device when the face authentication for the user is successful; and wherein the privilege includes an image obtained by performing predetermined processing on the face image of the user captured by the camera of the installed terminal, the predetermined processing comprises combining a character determined based on the route information with the captured face image of the user to obtain a composite image, and wherein the character changes in stages based on the route information.

9. A non-transitory computer readable medium storing a program for causing a computer to execute:

processing of acquiring a face image of a user acquired with a camera of one or more installed terminals arranged in various places, the one or more installed terminals including one or more gate devices;

processing of causing face authentication to be performed on face features extracted the acquired face image to be compared with feature points extracted from a face image of registered users;

processing of acquiring time information about a time when the face authentication has been successful;

processing of acquiring position information about the one or more installed terminals for which the face authentication has been successful;

processing of acquiring position information about a user terminal of the user based on a signal received from a GPS receiver;

processing of generating route information about the user based on the position information about the one or more installed terminals for which the face authentication has been successful, the position information of the user terminal of the user, and the time information about the time when the face authentication has been successful;

processing of determining a privilege for the user based on the route information; and processing of instructing the one or more installed terminals to provide services of each service provider through the installed terminal according to the success or failure of the face authentication;

processing of instructing the gate device of the one or more installed terminals to open a gate associated with the gate device when the face authentication for the user is successful; and wherein the privilege includes an image obtained by performing predetermined processing on the face image of the user captured by the camera of the installed terminal, the predetermined processing comprises combining a character determined based on the route information with the captured face image of the user to obtain a composite image, and wherein the character changes in stages based on the route information.

\* \* \* \* \*